(12) United States Patent
Song et al.

(10) Patent No.: US 12,493,167 B2
(45) Date of Patent: Dec. 9, 2025

(54) OPTICAL IMAGING LENS ASSEMBLY

(71) Applicant: Zhejiang Sunny Optics Co., Ltd, Yuyao (CN)

(72) Inventors: Yazhu Song, Yuyao (CN); Haidong Xiao, Yuyao (CN); Libang Cheng, Yuyao (CN); Qi Chen, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 378 days.

(21) Appl. No.: 18/142,280

(22) Filed: May 2, 2023

(65) Prior Publication Data

US 2023/0400662 A1    Dec. 14, 2023

(30) Foreign Application Priority Data

Jun. 10, 2022  (CN) .......................... 202210663840.0

(51) Int. Cl.
*G02B 9/64* (2006.01)
*G02B 7/02* (2021.01)
*G02B 13/00* (2006.01)

(52) U.S. Cl.
CPC ............... *G02B 9/64* (2013.01); *G02B 7/021* (2013.01); *G02B 7/026* (2013.01); *G02B 13/0045* (2013.01)

(58) Field of Classification Search
None
See application file for complete search history.

(56) References Cited

U.S. PATENT DOCUMENTS

| 10,908,378 | B2* | 2/2021 | Yang ................. G02B 27/0018 |
| 11,573,400 | B2* | 2/2023 | Chang .................... G02B 7/022 |
| 11,815,731 | B2* | 11/2023 | Chang .................... H04N 23/55 |
| 12,235,567 | B2* | 2/2025 | Yokoyama ............... G02B 1/04 |
| 2021/0263282 | A1* | 8/2021 | Zhou ...................... G02B 13/06 |

FOREIGN PATENT DOCUMENTS

| CN | 108873256 A | 11/2018 |
| CN | 109828350 A | 5/2019 |
| CN | 110082890 A | 8/2019 |
| CN | 210323543 U | 4/2020 |
| CN | 211786290 U | 10/2020 |

(Continued)

OTHER PUBLICATIONS

First Chinese Office Action for CN117250732A, dated Aug. 6, 2025, 9 pages.

*Primary Examiner* — Darryl J Collins
(74) *Attorney, Agent, or Firm* — Barnes & Thornburg

(57) ABSTRACT

The present disclosure discloses an optical imaging lens assembly. The optical imaging lens assembly includes a lens barrel and a lens group assembled in the lens barrel. The lens group along an optical axis from an object side to an image side sequentially includes a first lens, a second lens, a third lens, a fourth lens, a fifth lens, a sixth lens, and a seventh lens having refractive powers. An outer diameter of the seventh lens is greater than an outer diameter of any one of the first lens to the sixth lens; and three lenses of the first lens to the sixth lens have positive refractive powers, and other three lenses of the first lens to the sixth lens have negative refractive powers.

20 Claims, 7 Drawing Sheets

(56) References Cited

FOREIGN PATENT DOCUMENTS

| | | |
|---|---|---|
| CN | 112034599 A | 12/2020 |
| CN | 212623279 U | 2/2021 |
| CN | 113189752 A | 7/2021 |
| CN | 113238348 A | 8/2021 |
| CN | 114153051 A | 3/2022 |
| CN | 114355579 A | 4/2022 |
| CN | 114527555 A | 5/2022 |
| CN | 217360436 U | 9/2022 |

\* cited by examiner

OPTICAL IMAGING LENS ASSEMBLY

CROSS-REFERENCE TO RELATED APPLICATIONS

This application claims the priority from Chinese Patent Application No. 202210663840.0, filed in the National Intellectual Property Administration (CNIPA) on Jun. 10, 2022, the content of which is hereby incorporated by reference in its entirety.

TECHNICAL FIELD

The present disclosure relates to the field of optical elements, in particular, to an optical imaging lens assembly.

BACKGROUND

With the development of science and technology, users have put forward higher requirements for the photographing performance of cell phones in different scenarios. Therefore, the cell phone industry has increasingly high requirements for hardware and software installed on cell phones. In particular, major smartphone manufacturers have put forward higher design requirements for optical imaging lens assemblies assembled on smartphones, in order to improve the competitiveness of their products.

In the field of optical imaging lens assemblies, the presence of stray light phenomenon and the deviation of assembly stability seriously affect an imaging quality of the imaging lens assemblies. For example, under normal conditions, if refractive powers of lenses in an optical imaging lens assembly are not reasonably set, it may lead to a messy deflection path of light in the optical imaging lens assembly, which may easily produce stray light; if the size of a lens close to an image side in the optical imaging lens assembly is not reasonably set, it may not be possible to achieve a good image plane size. On the other hand, if the design such as position and size of a spacing element in the optical imaging lens assembly is unreasonable, it may also lead to a messy deflection path of light in the optical imaging lens assembly, which may easily produce stray light. In addition, if the design such as position and size of the spacing element in the optical imaging lens assembly is unreasonable, it may also lead to poor stability between the lenses, which may lead to poor assembly stability of the optical imaging lens assembly.

SUMMARY

In one aspect, the present disclosure provides an optical imaging lens assembly, and the optical imaging lens assembly includes a lens barrel and a lens group assembled in the lens barrel. The lens group along an optical axis from an object side to an image side sequentially includes a first lens, a second lens, a third lens, a fourth lens, a fifth lens, a sixth lens, and a seventh lens having refractive powers. An outer diameter of the seventh lens is greater than an outer diameter of any one of the first lens to the sixth lens; and three lenses of the first lens to the sixth lens have positive refractive powers, and other three lenses of the first lens to the sixth lens have negative refractive powers. The optical imaging lens assembly further includes: a first spacing element located between the first lens and the second lens; and a second spacing element located between the second lens and the third lens. The optical imaging lens assembly may satisfy: $24<D1s/(EP01-EP12)+D2m/CT2<42$, where D1s is an outer diameter of an object-side surface of the first spacing element, EP01 is a spacing distance between an object side end of the lens barrel and the object-side surface of the first spacing element in a direction parallel to the optical axis, EP12 is a spacing distance between an image-side surface of the first spacing element and an object-side surface of the second spacing element in the direction parallel to the optical axis, D2m is an outer diameter of an image-side surface of the second spacing element, and CT2 is a center thickness of the second lens on the optical axis.

In an implementation, at least one of the surfaces from the object-side surface of the first lens to the image-side surface of the seventh lens is an aspheric surface.

In an implementation, the optical imaging lens assembly further comprises: a third spacing element located between the third lens and the fourth lens, the optical imaging lens assembly satisfies: $14<|d0m/R1|+EP23/(CT3-CT2)<20$, wherein, d0m is an inner diameter of an image side end of the lens barrel, R1 is a radius of curvature of an object-side surface of the first lens, EP23 is a spacing distance between the image-side surface of the second spacing element and an object-side surface of the third spacing element in the direction parallel to the optical axis, and CT3 is a center thickness of the third lens on the optical axis.

In an implementation, the optical imaging lens assembly further comprises: a fourth spacing element located between the fourth lens and the fifth lens, the optical imaging lens assembly satisfies: $27.0<R6/CT3+D4s/CT4<38.5$, wherein, R6 is a radius of curvature of an image-side surface of the third lens, CT3 is a center thickness of the third lens on the optical axis, CT4 is a center thickness of the fourth lens on the optical axis, and D4s is an outer diameter of an object-side surface of the fourth spacing element.

In an implementation, the optical imaging lens assembly further comprises: a sixth spacing element located between the sixth lens and the seventh lens; and a seventh spacing element located on an image-side surface of the seventh lens; the optical imaging lens assembly satisfies: $2.0<(|D7m/R14|-|d6s/R10|)\times Fno<5.0$, wherein, R10 is a radius of curvature of an image-side surface of the fifth lens, R14 is a radius of curvature of the image-side surface of the seventh lens, Fno is a relative F number of the optical imaging lens assembly, d6s is an inner diameter of an object-side surface of the sixth spacing element, and D7m is an outer diameter of an image-side surface of the seventh spacing element.

In an implementation, the optical imaging lens assembly further comprises: a fifth spacing element located between the fifth lens and the sixth lens, the optical imaging lens assembly satisfies: $18.0<D4m/EP45+ds/T45<29$, wherein, D4m is an outer diameter of an image-side surface of the fourth spacing element, EP45 is a spacing distance between the image-side surface of the fourth spacing element and an object-side surface of the fifth spacing element in the direction parallel to the optical axis, ds is an open bore inner diameter of the object side end of the lens barrel, and T45 is a spacing distance between an image-side surface of the fourth lens and an object-side surface of the fifth lens on the optical axis.

In an implementation, the optical imaging lens assembly satisfies: $8.0<d5s/CT4<11.0$, wherein, d5s is an inner diameter of the object-side surface of the fifth spacing element, and CT4 is the center thickness of the fourth lens on the optical axis.

In an implementation, the optical imaging lens assembly satisfies: $30.0<R2/(CT6-T56)+|D7s/R10|<61.0$, wherein, D7s is an outer diameter of an object-side surface of the seventh spacing element, CT6 is a center thickness of the sixth lens on the optical axis, T56 is a spacing distance between the image-side surface of the fifth lens and an object-side surface of the sixth lens on the optical axis, R2 is a radius of curvature of an image-side surface of the first lens, and R10 is the radius of curvature of the image-side surface of the fifth lens.

In an implementation, the optical imaging lens assembly further comprises: a fifth spacing element located between the fifth lens and the sixth lens, the optical imaging lens assembly satisfies: $39<d5s/T56+d3s/CT3<60$, wherein, T56 is a spacing distance between an image-side surface of the fifth lens and an object-side surface of the sixth lens on the optical axis, d3s is an inner diameter of the object-side surface of the third spacing element, d5s is an inner diameter of an object-side surface of the fifth spacing element, and CT3 is the center thickness of the third lens on the optical axis.

In an implementation, the optical imaging lens assembly satisfies: $4.0<d5m\times R10/(SD52\times R11)<7.0$, wherein, d5m is an inner diameter of an image-side surface of the fifth spacing element, R10 is a radius of curvature of the image-side surface of the fifth lens, R11 is a radius of curvature of the object-side surface of the sixth lens, and SD52 is a maximal effective radius of the image-side surface of the fifth lens.

In an implementation, an object-side surface of the fourth lens is a convex surface, and the image-side surface of the fourth lens is a convex surface.

In an implementation, a refractive power φ5 of the fifth lens and a refractive power φ7 of the seventh lens satisfy: φ5×φ7>0.

In another aspect, the present disclosure provides an optical imaging lens assembly, and the optical imaging lens assembly includes a lens barrel and a lens group assembled in the lens barrel. The lens group along an optical axis from an object side to an image side sequentially includes a first lens, a second lens, a third lens, a fourth lens, a fifth lens, a sixth lens, and a seventh lens having refractive powers. A refractive power φ5 of the fifth lens and a refractive power φ7 of the seventh lens may satisfy: φ5×φ7>0. The optical imaging lens assembly further includes: a third spacing element located between the third lens and the fourth lens; and a fifth spacing element located between the fifth lens and the sixth lens. The optical imaging lens assembly may satisfy: $39<d5s/T56+d3s/CT3<60$, where, T56 is a spacing distance between an image-side surface of the fifth lens and an object-side surface of the sixth lens on the optical axis, d3s is an inner diameter of an object-side surface of the third spacing element, d5s is an inner diameter of an object-side surface of the fifth spacing element, and CT3 is a center thickness of the third lens on the optical axis.

In an implementation, the optical imaging lens assembly further comprises: a first spacing element located between the first lens and the second lens; and a second spacing element located between the second lens and the third lens; the optical imaging lens assembly satisfies: $24<D1s/(EP01-EP12)+D2m/CT2<42$, wherein D1s is an outer diameter of an object-side surface of the first spacing element, EP01 is a spacing distance between an object side end of the lens barrel and the object-side surface of the first spacing element in a direction parallel to the optical axis, EP12 is a spacing distance between an image-side surface of the first spacing element and an object-side surface of the second spacing element in the direction parallel to the optical axis, D2m is an outer diameter of an image-side surface of the second spacing element, and CT2 is a center thickness of the second lens on the optical axis.

In an implementation, the optical imaging lens assembly satisfies: $14<|d0m/R1|+EP23/(CT3-CT2)<20$, wherein, d0m is an inner diameter of an image side end of the lens barrel, R1 is a radius of curvature of an object-side surface of the first lens, EP23 is a spacing distance between the image-side surface of the second spacing element and the object-side surface of the third spacing element in the direction parallel to the optical axis, and CT3 is the center thickness of the third lens on the optical axis.

In an implementation, the optical imaging lens assembly further comprises: a fourth spacing element located between the fourth lens and the fifth lens, the optical imaging lens assembly satisfies: $27.0<R6/CT3+D4s/CT4<38.5$, wherein, R6 is a radius of curvature of an image-side surface of the third lens, CT4 is a center thickness of the fourth lens on the optical axis, and D4s is an outer diameter of an object-side surface of the fourth spacing element.

In an implementation, the optical imaging lens assembly further comprises: a sixth spacing element located between the sixth lens and the seventh lens; and a seventh spacing element located on an image-side surface of the seventh lens; the optical imaging lens assembly satisfies: $2.0<(|D7m/R14|-|d6s/R10H|)\times Fno<5.0$, wherein, R10 is a radius of curvature of the image-side surface of the fifth lens, R14 is a radius of curvature of the image-side surface of the seventh lens, Fno is a relative F number of the optical imaging lens assembly, d6s is an inner diameter of an object-side surface of the sixth spacing element, and D7m is an outer diameter of an image-side surface of the seventh spacing element.

In an implementation, the optical imaging lens assembly satisfies: $18.0<D4m/EP45+ds/T45<29$, wherein, D4m is an outer diameter of an image-side surface of the fourth spacing element, EP45 is a spacing distance between the image-side surface of the fourth spacing element and the object-side surface of the fifth spacing element in the direction parallel to the optical axis, ds is an open bore inner diameter of an object side end of the lens barrel, and T45 is a spacing distance between an image-side surface of the fourth lens and an object-side surface of the fifth lens on the optical axis.

In an implementation, the optical imaging lens assembly satisfies: $8.0<d5s/CT4<11.0$, wherein, CT4 is a center thickness of the fourth lens on the optical axis.

In an implementation, the optical imaging lens assembly satisfies: $30.0<R2/(CT6-T56)+|D7s/R10|<61.0$, wherein, D7s is an outer diameter of an object-side surface of the seventh spacing element, CT6 is a center thickness of the sixth lens on the optical axis, R2 is a radius of curvature of an image-side surface of the first lens, and R10 is the radius of curvature of the image-side surface of the fifth lens.

In an implementation, the optical imaging lens assembly satisfies: $4.0<d5m\times R10/(SD52\times R11)<7.0$, wherein, d5m is an inner diameter of an image-side surface of the fifth spacing element, R10 is a radius of curvature of the image-side surface of the fifth lens, R11 is a radius of curvature of the object-side surface of the sixth lens, and SD52 is a maximal effective radius of the image-side surface of the fifth lens.

In an implementation, an object-side surface of the fourth lens is a convex surface, and the image-side surface of the fourth lens is a convex surface.

BRIEF DESCRIPTION OF THE DRAWINGS

Other features, objectives, and advantages of the present disclosure will become more apparent from the following detailed description of the non-limiting embodiments with reference to the accompanying drawings.

DETAILED DESCRIPTION OF EMBODIMENTS

Figure 1:
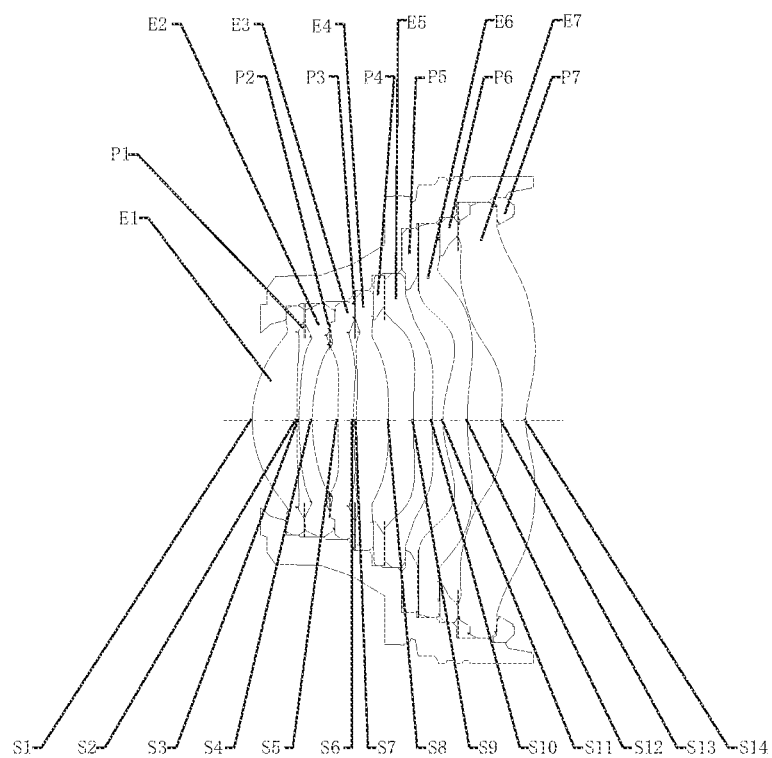
FIG. 1 illustrates a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, without departing from the teachings of the present disclosure, the first lens discussed below may also be referred to as the second lens or the third lens, and the first spacing element may also be referred to as the second spacing element or the third spacing element.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale. It should be understood that the thicknesses, sizes and shapes of the spacing elements and the lens barrel are also slightly exaggerated in the accompanying drawings for convenience of explanation.

Herein, a paraxial area refers to an area near an optical axis. If a lens surface is a convex surface and the position of the convex surface is not defined, it represents that the lens surface is a convex surface at least in the paraxial area. If the lens surface is a concave surface and the position of the concave surface is not defined, it represents that the lens surface is a concave surface at least in the paraxial area. In each lens, a surface closest to a photographed object is referred to as the object-side surface of the lens, and a surface closest to an image plane is referred to as the image-side surface of the lens. It should be understood that a surface of each spacing element closest to the photographed object is referred to as an object-side surface of the spacing element, and a surface of each spacing element closest to the image plane is referred to as an image-side surface of the spacing element. A surface of the lens barrel closest to the photographed object is referred to as an object side end of the lens barrel, and a surface of the lens barrel closest to the image plane is referred to as an image side end of the lens barrel.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments express only several implementations of the present disclosure, and their descriptions are more specific and detailed, but they are not to be construed as a limitation to the scope of patent of the present disclosure. It should be noted that, for those of ordinary skill in the art, without departing from the concept of the present disclosure, a number of deformations and improvements can be made, which all fall within the scope of protection of the present disclosure. For example, the lens group (i.e., first lens to seventh lens), lens barrel structure and spacing elements in each embodiment of the present disclosure may be combined with each other in any way, and it is not limited to that the lens group in an embodiment can only be combined with the lens barrel structure, spacing elements, etc. in that embodiment. The present disclosure will be described in detail below with reference to the accompanying drawings and in conjunction with the embodiments.

Features, principles and other aspects of the present disclosure are described below in detail.

An optical imaging lens assembly according to exemplary implementations of the present disclosure may include a lens barrel and a lens group assembled in the lens barrel. The lens group may include seven lenses having refractive powers, namely, a first lens, a second lens, a third lens, a fourth lens, a fifth lens, a sixth lens, and a seventh lens. The seven lenses are arranged sequentially along the optical axis from an object side to an image side. Any two adjacent lenses in the first lens to the seventh lens may have a spacing distance therebetween. The lens barrel may accommodate the first lens to the seventh lens.

According to the exemplary implementations of the present disclosure, each of the first lens to the seventh lens may have an optical area for optical imaging and a non-optical area extending outwardly from an outer periphery of the optical area. Generally speaking, the optical area is an area of the lens for optical imaging and the non-optical area is a structural area of the lens. During assembling of the optical imaging lens assembly, a spacing element may be provided at the non-optical area of each lens by a process such as dispensing and bonding, and the lenses are coupled to the lens barrel respectively, i.e., the lenses are against an inner wall of the lens barrel. During imaging of the optical imaging lens assembly, the optical areas of the lenses may transmit light from an object to form an optical pathway to form a final optical image. The non-optical areas of the lenses after the assembly are accommodated in the lens barrel that cannot transmit light, so that the non-optical areas are not directly involved in the imaging process of the optical imaging lens assembly. It should be noted that for ease of description, the present disclosure divides the lenses into two parts for description, the optical area and the non-optical area, but it should be understood that both the optical area and the non-optical area of the lenses may be formed as a whole during manufacturing, rather than being formed into two separate parts.

The optical imaging lens assembly according to the exemplary implementations of the present disclosure may include seven spacing elements located respectively on the image-side surfaces of the first lens to the seventh lens, namely, a first spacing element, a second spacing element, a third spacing element, a fourth spacing element, a fifth spacing element, a sixth spacing element, and a seventh spacing element. In particular, the optical imaging lens assembly may include the first spacing element located between the first lens and the second lens, which may be against the non-optical area on an image-side surface of the first lens; the second spacing element located between the second lens and the third lens, which may be against the non-optical area on an image-side surface of the second lens; the third spacing element located between the third lens and the fourth lens, which may be against the non-optical area on an image-side surface of the third lens; the fourth spacing element located between the fourth lens and the fifth lens, which may be against the non-optical area on an image-side surface of the fourth lens; the fifth spacing element located between the fifth lens and the sixth lens, which may be against the non-optical area on an image-side surface of the fifth lens; the sixth spacing element located between the sixth lens and the seventh lens, which may be against the non-optical area on an image-side surface of the sixth lens; and the seventh spacing element located on an image-side surface of the seventh lens, which may be against the non-optical area on the image-side surface of the seventh lens. Exemplarily, the first spacing element may be in contact with the non-optical area of the image-side surface of the first lens and may also be in contact with the non-optical area of an object-side surface of the second lens. For example, an object-side surface of the first spacing element may be in contact with the non-optical area of the image-side surface of the first lens, and an image-side surface of the first spacing element may be in contact with the non-optical area of the object-side surface of the second lens; and so on, an object-side surface of the seventh spacing element may be in contact with the non-optical area of the image-side surface of the seventh lens.

According to the exemplary implementations of the present disclosure, the spacing elements may include at least one spacer, and by reasonably setting the number, thickness, inner diameter and outer diameter of the spacer, it is conducive to improving assembly of the optical imaging lens assembly, to blocking stray light, and to improving an imaging quality of the optical imaging lens assembly. Exemplarily, the spacing elements may also include at least one spacer ring, and by controlling the thickness and structure of the spacer ring, it is conducive to improving assembly stability of the optical imaging lens assembly. Exemplarily, the seventh spacing element may include at least one pressing ring, which is conducive to improving stability of the assembled optical imaging lens assembly and making the optical imaging lens assembly reliable.

According to the exemplary implementations of the present disclosure, an outer diameter of the seventh lens is greater than an outer diameter of any one of the first lens to the sixth lens.

According to the exemplary implementations of the present disclosure, three of the first lens to the sixth lens have positive refractive powers, and the other three lenses have negative refractive powers. In other words, the number of lenses having positive refractive powers in the first lens to the sixth lens is the same as the number of lenses having negative refractive powers in the first lens to the sixth lens. This refractive power setting is not only conducive to rapid convergence of light after passing through the first lens, converging the aperture, so that the lenses having positive refractive powers can guide light convergence in an inner field-of-view and correct paraxial aberrations, but also is conducive to making the lenses having negative refractive powers guide light convergence in an outer field-of-view, correct aberrations in the outer field-of-view, and improve the imaging quality of the lens assembly by reasonably controlling the refractive powers of the lenses.

In the exemplary implementations, the optical imaging lens assembly according to the present disclosure may satisfy: $24 < D1s/(EP01-EP12) + D2m/CT2 < 42$, where $D1s$ is an outer diameter of the object-side surface of the first spacing element, $EP01$ is a spacing distance between an object side end of the lens barrel and the object-side surface of the first spacing element in a direction parallel to the optical axis, $EP12$ is a spacing distance between the image-side surface of the first spacing element and an object-side surface of the second spacing element in the direction parallel to the optical axis, $D2m$ is an outer diameter of an image-side surface of the second spacing element, and $CT2$ is a center thickness of the second lens on the optical axis. Satisfying $24 < D1s/(EP01-EP12) + D2m/CT2 < 42$ may effectively constrain an OD to center thickness ratio of the second lens within a reasonable range, improve processability of the second lens, improve a yield, and also help to reasonably distribute the refractive power of each lens and improve the imaging quality.

In the exemplary implementations, the optical imaging lens assembly according to the present disclosure may satisfy: $14<|d0m/R1|+EP23/(CT3-CT2)<20$, where, d0m is an inner diameter of an image side end of the lens barrel, R1 is a radius of curvature of an object-side surface of the first lens, EP23 is a spacing distance between the image-side surface of the second spacing element and an object-side surface of the third spacing element in the direction parallel to the optical axis, CT2 is the center thickness of the second lens on the optical axis, and CT3 is a center thickness of the third lens on the optical axis. Satisfying $14<|d0m/R1|+EP23/(CT3-CT2)<20$ is conducive to constraining refractive power distribution of the first lens by reasonably controlling the radius of curvature of the object-side surface of the first lens, thus aberration correction of the first lens may be effectively controlled. In addition, by constraining the center thicknesses of the third lens and the second lens, it helps to reasonably distribute the refractive power of each lens and improve the imaging quality.

In the exemplary implementations, the optical imaging lens assembly according to the present disclosure may satisfy: $27.0<R6/CT3+D4s/CT4<38.5$, where, R6 is a radius of curvature of the image-side surface of the third lens, CT3 is the center thickness of the third lens on the optical axis, CT4 is a center thickness of the fourth lens on the optical axis, and D4s is an outer diameter of an object-side surface of the fourth spacing element. Satisfying $27.0<R6/CT3+D4s/CT4<38.5$, the surface type of the third lens can be smoothed by controlling a ratio of the radius of curvature of the image-side surface of the third lens to the center thickness of the third lens within a certain interval, which is conducive to molding and manufacturing of the third lens having a large diameter. Since the center thickness of the fourth lens is relatively more sensitive, processability of the fourth lens may be effectively improved by controlling a ratio of the outer diameter of the object-side surface of the fourth spacing element to the center thickness of the fourth lens, and the problem of low yield due to poor molding may be improved.

In the exemplary implementations, the optical imaging lens assembly according to the present disclosure may satisfy: $2.0<(|D7m/R14|-|d6s/R10|)\times Fno<5.0$, where, R10 is a radius of curvature of the image-side surface of the fifth lens, R14 is a radius of curvature of the image-side surface of the seventh lens, Fno is a relative F number of the optical imaging lens assembly, d6s is an inner diameter of an object-side surface of the sixth spacing element, and D7m is an outer diameter of an image-side surface of the seventh spacing element. Satisfying $2.0<(|D7m/R14|-|d6s/R10|)\times Fno<5.0$ can not only ensure that light continues to show a convergence trend when passing through the sixth lens to ensure the rationality of light tendency, but also control the inner diameter of the object-side surface of the seventh spacing element to effective block stray light and improve the imaging quality, etc.

In the exemplary implementations, the optical imaging lens assembly according to the present disclosure may satisfy: $18.0<D4m/EP45+ds/T45<29$, where, D4m is an outer diameter of an image-side surface of the fourth spacing element, EP45 is a spacing distance between the image-side surface of the fourth spacing element and an object-side surface of the fifth spacing element in the direction parallel to the optical axis, ds is an open bore inner diameter of the object side end of the lens barrel, and T45 is a spacing distance between the image-side surface of the fourth lens and an object-side surface of the fifth lens on the optical axis. Satisfying $18.0<D4m/EP45+ds/T45<29$ helps to control the air spacing between the fourth lens and the fifth lens, a large segment difference structure between the fourth lens and the fifth lens may be effectively improved by setting the fourth spacing element, and the assembly stability and the yield may be effectively improved by auxiliary support between the fourth spacing element and the lens barrel.

In the exemplary implementations, the optical imaging lens assembly according to the present disclosure may satisfy: $8.0<d5s/CT4<11.0$, where, d5s is an inner diameter of the object-side surface of the fifth spacing element, and CT4 is the center thickness of the fourth lens on the optical axis. Satisfying $8.0<d5s/CT4<11.0$ may reduce excessive deflection of light after passing through the fourth lens, while assembly stability between the fifth spacing element and the fourth lens may be improved by controlling the inner diameter of the object-side surface of the fifth spacing element.

In the exemplary implementations, the optical imaging lens assembly according to the present disclosure may satisfy: $30.0<R2/(CT6-T56)+|D7s/R10|<61.0$, where, D7s is an outer diameter of the object-side surface of the seventh spacing element, CT6 is a center thickness of the sixth lens on the optical axis, T56 is a spacing distance between the image-side surface of the fifth lens and an object-side surface of the sixth lens on the optical axis, R2 is a radius of curvature of the image-side surface of the first lens, and R10 is the radius of curvature of the image-side surface of the fifth lens. Satisfying $30.0<R2/(CT6-T56)+|D7s/R10|<61.0$ may effectively control the center thickness of the sixth lens and the air spacing between the fifth lens and the sixth lens, by setting the auxiliary support between the sixth lens and the lens barrel, a large segment difference structure between the fifth lens and the sixth lens may be effectively improved, thus improving the assembly stability and the yield. In addition, through this condition, the radius of curvature of the image-side surface of the fifth lens may be effectively constrained, which may reduce a deflection angle of light and improve the imaging quality of the optical imaging lens assembly.

In the exemplary implementations, the optical imaging lens assembly according to the present disclosure may satisfy: $39<d5s/T56+d3s/CT3<60$, where, T56 is the spacing distance between the image-side surface of the fifth lens and the object-side surface of the sixth lens on the optical axis, d3s is an inner diameter of the object-side surface of the third spacing element, d5s is the inner diameter of the object-side surface of the fifth spacing element, and CT3 is the center thickness of the third lens on the optical axis. Satisfying $39<d5s/T56+d3s/CT3<60$ may control the deflection angle of light in the optical imaging lens assembly, reduce an overall size of the lens assembly, realize miniaturization of the lens assembly, and at the same time by controlling the inner diameter of the object-side surface of the third spacing element, it may effectively block stray light and improve the imaging quality.

In the exemplary implementations, the optical imaging lens assembly according to the present disclosure may satisfy: $4.0<d5m\times R10/(SD52)(R11)<7.0$, where, d5m is an inner diameter of an image-side surface of the fifth spacing element, R10 is the radius of curvature of the image-side surface of the fifth lens, R11 is a radius of curvature of the object-side surface of the sixth lens, and SD52 is a maximal effective radius of the image-side surface of the fifth lens. Satisfying $4.0<d5m\times R10/(SD52\times R11)<7.0$ may reduce the deflection angle of light in the optical imaging lens assembly and improve the imaging quality of the optical imaging lens assembly. In addition, by controlling the inner and outer diameters of the image-side surface of the fifth spacing element, it can not only effectively control a width of the fifth spacing element supporting the lens barrel, but also effectively block stray light and improve the imaging quality.

According to the exemplary implementations of the present disclosure, an object-side surface of the fourth lens is a convex surface, and the image-side surface of the fourth lens is a convex surface. Setting the fourth lens to a convex-convex surface type may effectively correct aberrations and improve the imaging quality of the optical imaging lenses assembly.

According to the exemplary implementations of the present disclosure, the optical imaging lens assembly according to the present disclosure may satisfy: $\varphi 5 \times \varphi 7 > 0$, where, $\varphi 5$ is a refractive power of the fifth lens, and $\varphi 7$ is a refractive power of the seventh lens. In other words, the fifth lens and the seventh lens may have the same consistent refractive powers. Satisfying $\varphi 5 \times \varphi 7 > 0$ may guide the convergence of light in the inner field-of-view and the outer field-of-view, correct paraxial aberrations and aberrations in the outer field-of-view, and is beneficial for light to cover as much of the different refractive power ranges as possible, improving the imaging quality.

In the exemplary implementations, a total effective focal length f of the optical imaging lens assembly may be in a range of 5 mm to 6.5 mm; an effective focal length f1 of the first lens may be in a range of 5.5 mm to 6.5 mm; an effective focal length f2 of the second lens may be in a range of −18 mm to −13 mm; an effective focal length f3 of the third lens may be in a range of −34 mm to −27 mm; an effective focal length f4 of the fourth lens may be in a range of 13 mm to 17.5 mm; an effective focal length f5 of the fifth lens may be in a range of −23 mm to −8 mm; an effective focal length f6 of the sixth lens may be in a range of 4 mm to 6.5 mm; and an effective focal length f7 of the seventh lens may be in a range of −5 mm to −4 mm.

In the exemplary implementations, a distance TTL from a center of the object-side surface of the first lens to the image plane of the optical imaging lens assembly on the optical axis may be in a range of 6.5 mm to 8 mm; half of a diagonal length ImgH of an effective pixel area on the image plane of the optical imaging lens assembly may be in a range of 5 mm to 6 mm; half of a maximal field-of-view Semi-FOV of the optical imaging lens assembly may be in a range of 41° to 44°; and a relative F-number Fno of the optical imaging lens assembly may be in a range of 1.4 to 1.6.

In the exemplary implementations, the optical imaging lens assembly according to the present disclosure also includes a diaphragm disposed between the object side and the first lens. Alternatively, the above optical imaging lens assembly may further include an optical filter for correcting color deviation and/or a protective glass for protecting a photosensitive element on the image plane. The present disclosure proposes an optical imaging lens assembly having characteristics such as large image plane, good assembly stability, high light convergence ability and high imaging quality. The optical imaging lens assembly according to the above implementations of the present disclosure may use a plurality of lenses, for example, the above seven lenses. By reasonably distributing the refractive powers, the surface types, the materials of the lenses, the center thicknesses of the lenses and the axial spacing between the lenses, etc., it may effectively converge incident light, reduce the total track length of the imaging lens assembly and improve the processability of the imaging lens assembly, making the optical imaging lens assembly more conducive to production and processing. By reasonably matching the lenses, spacing elements and the lens barrel, the present disclosure is conducive to a uniform distribution of the lenses, enhancing the light convergence ability, and improving the imaging quality.

In the implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, and the seventh lens is an aspheric lens. Alternatively, the object-side surface and the image-side surface of each of the first lens, the second lens, the third lens, the fourth lens, the fifth lens, the sixth lens, and the seventh lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to including the seven lenses. If desired, the optical imaging lens assembly may also include other numbers of lenses. At least one spacer may be included between any two adjacent lenses.

Specific embodiments of the optical imaging lens assembly that may be applicable to the above implementations are further described below with reference to the accompanying drawings.

Embodiment 1

An optical imaging lens assembly according to Embodiment 1 of the present disclosure is described below with reference to FIG. 1. FIG. 1 is a schematic structural diagram of the optical imaging lens assembly according to Embodiment 1 of the present disclosure.

As shown in FIG. 1, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 1, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter has an object-side surface S15 and an image-side surface S16. Light from an object sequentially passes through the surfaces S1-S16 and finally forms an image on the image plane 17.

Table 1 shows a table of basic parameters of the optical imaging lens assembly in Embodiment 1. Here, the units of a radius of curvature, a thickness/distance and a focal length are millimeters (mm).

TABLE 1

| surface number | surface type | radius of curvature | thickness/ distance | material refractive index | material abbe number | focal length | conic coefficient |
|---|---|---|---|---|---|---|---|
| OBJ | spherical | infinite | infinite | | | | |
| STO | spherical | infinite | −0.2741 | | | | |
| S1 | aspheric | 2.7591 | 1.0022 | 1.54 | 56.1 | 5.75 | 0.0000 |
| S2 | aspheric | 20.0441 | 0.0500 | | | | 0.0000 |
| S3 | aspheric | 6.8379 | 0.2925 | 1.67 | 19.2 | −13.18 | 0.0000 |
| S4 | aspheric | 3.8059 | 0.5767 | | | | 0.0000 |
| S5 | aspheric | 9.9186 | 0.3456 | 1.67 | 19.2 | −27.58 | 0.0000 |
| S6 | aspheric | 6.3883 | 0.0783 | | | | 0.0000 |
| S7 | aspheric | 15.3328 | 0.7232 | 1.54 | 56.1 | 13.29 | 0.0000 |
| S8 | aspheric | −13.5313 | 0.5514 | | | | 0.0000 |
| S9 | aspheric | 14.0527 | 0.4168 | 1.57 | 37.3 | −22.52 | 0.0000 |
| S10 | aspheric | 6.6384 | 0.2072 | | | | 0.0000 |
| S11 | aspheric | 2.3383 | 0.5496 | 1.54 | 56.1 | 6.11 | −0.9946 |
| S12 | aspheric | 7.1730 | 0.7661 | | | | 0.0007 |
| S13 | aspheric | 5.3626 | 0.5445 | 1.54 | 55.6 | −4.93 | 0.0232 |
| S14 | aspheric | 1.7106 | 0.3854 | | | | −1.0010 |
| S15 | spherical | infinite | 0.2100 | 1.52 | 64.2 | | |
| S16 | spherical | infinite | 0.5690 | | | | |
| S17 | spherical | infinite | | | | | |

Table 2-1 and Table 2-2 show tables of basic parameters of the lens barrel and the spacing elements in the optical imaging lens assembly of Embodiment 1, where the units of the parameters in Table 2-1 and Table 2-2 are millimeters (mm).

TABLE 2-1

| D1s | D2m | d3s | D4s | D4m | d5s | d5m | d6s | SD52 |
|---|---|---|---|---|---|---|---|---|
| 5.30 | 4.42 | 3.72 | 6.50 | 6.54 | 5.90 | 6.56 | 7.54 | 2.73 |

TABLE 2-2

| D7s | D7m | ds | d0m | EP01 | EP12 | EP23 | EP45 |
|---|---|---|---|---|---|---|---|
| 10.10 | 9.85 | 3.98 | 10.57 | 0.99 | 0.41 | 0.55 | 0.39 |

It should be understood that in this example, only the structure and parameters of the lens barrel and the spacing elements in Embodiment 1 are exemplarily listed, and the specific structure and actual parameters of the lens barrel and the spacing elements are not explicitly limited. The specific structure and actual parameters of the lens barrel and the spacing elements may be set in any suitable way in actual production.

In this example, a total effective focal length f of the optical imaging lens assembly is 5.77 mm, a total track length of the optical imaging lens assembly (i.e., a distance from the object-side surface S1 of the first lens E1 to the image plane S17 of the optical imaging lens assembly on the optical axis) TTL is 7.27 mm, half of a diagonal length ImgH of an effective pixel area on the image plane of the optical imaging lens assembly is 5.38 mm, half of a maximal field-of-view Semi-FOV of the optical imaging lens assembly is 42.37°, and a relative F-number Fno of the optical imaging lens assembly is 1.46.

In Embodiment 1, both the object-side surface and the image-side surface of any lens in the first lens E1 to the seventh lens E7 are aspheric surfaces, and the surface type x of an aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 3-1 and Table 3-2 below show the high-order coefficients $A_4$, $A_6$, $A_8$, $A_{10}$, $A_{12}$, $A_{14}$, $A_{16}$, $A_{19}$, $A_{20}$, $A_{22}$, $A_{24}$, $A_{26}$, $A_{28}$ and $A_{30}$ applicable to the aspheric surfaces S1 to S14 in Embodiment 1.

TABLE 3-1

| surface number | A4 | A6 | A8 | A10 | A12 | A14 | A16 |
|---|---|---|---|---|---|---|---|
| S1  | −2.3796E−03 | 1.1773E−02  | −3.7353E−02 | 7.5532E−02  | −1.0120E−01 | 9.1085E−02  | −5.4990E−02 |
| S2  | −4.3106E−02 | 8.4869E−02  | −1.4581E−01 | 2.7191E−01  | −4.3462E−01 | 5.0855E−01  | −4.2272E−01 |
| S3  | −5.9726E−02 | 9.6794E−02  | −1.3949E−01 | 2.2354E−01  | −3.2409E−01 | 3.5082E−01  | −2.6619E−01 |
| S4  | −2.3936E−02 | −2.7994E−03 | 1.5007E−01  | −5.7104E−01 | 1.3260E+00  | −2.1119E+00 | 2.3821E+00  |
| S5  | −2.9946E−02 | −1.8655E−03 | −1.8721E−02 | 1.2652E−01  | −3.7664E−01 | 6.5344E−01  | −7.4223E−01 |
| S6  | −2.2628E−02 | −4.8844E−02 | 1.1800E−01  | −1.8315E−01 | 2.0884E−01  | −1.9476E−01 | 1.5207E−01  |
| S7  | −8.9295E−03 | −5.3367E−02 | 1.2176E−01  | −1.9819E−01 | 2.5617E−01  | −2.5935E−01 | 1.9698E−01  |
| S8  | −1.4898E−02 | −2.1165E−02 | 6.0507E−02  | −1.4958E−01 | 2.5388E−01  | −2.9478E−01 | 2.4040E−01  |
| S9  | −2.9052E−03 | −1.3243E−02 | 1.9039E−02  | −1.7445E−02 | −2.9520E−04 | 1.6523E−02  | −1.8300E−02 |
| S10 | −7.2496E−02 | 1.9371E−02  | 2.7104E−02  | −6.1639E−02 | 6.1649E−02  | −3.8613E−02 | 1.6377E−02  |
| S11 | −5.7573E−02 | 5.7320E−03  | 2.5997E−02  | −4.2558E−02 | 3.3398E−02  | −1.6370E−02 | 5.4377E−03  |
| S12 | 8.9168E−04  | −6.7148E−03 | 1.1017E−02  | −1.5514E−02 | 1.0841E−02  | −4.5175E−03 | 1.2402E−03  |
| S13 | −1.8372E−01 | 6.0799E−02  | −1.5007E−05 | −1.3028E−02 | 7.6155E−03  | −2.3636E−03 | 4.6774E−04  |
| S14 | −2.0017E−01 | 1.0631E−01  | −4.6929E−02 | 1.6012E−02  | −4.0998E−03 | 7.8142E−04  | −1.1065E−04 |

TABLE 3-2

| surface number | A18 | A20 | A22 | A24 | A26 | A28 | A30 |
|---|---|---|---|---|---|---|---|
| S1  | 2.1567E−02  | −4.8760E−03 | 2.8041E−04  | 1.7180E−04  | −5.3121E−05 | 6.5684E−06  | −3.1658E−07 |
| S2  | 2.5063E−01  | −1.0635E−01 | 3.2069E−02  | −6.7107E−03 | 9.2654E−04  | −7.5894E−05 | 2.7926E−06  |
| S3  | 1.3903E−01  | −4.8804E−02 | 1.0822E−02  | −1.2475E−03 | −5.3841E−07 | 1.7246E−05  | −1.3963E−06 |
| S4  | −1.9264E+00 | 1.1188E+00  | −4.6212E−01 | 1.3237E−01  | −2.4980E−02 | 2.7919E−03  | −1.3996E−04 |
| S5  | 5.7932E−01  | −3.1655E−01 | 1.2098E−01  | −3.1671E−02 | 5.4051E−03  | −5.4065E−04 | 2.3972E−05  |
| S6  | −9.6024E−02 | 4.6855E−02  | −1.6925E−02 | 4.3188E−03  | −7.2968E−04 | 7.2795E−05  | −3.2341E−06 |
| S7  | −1.0862E−01 | 4.2831E−02  | −1.1939E−02 | 2.3027E−03  | −2.9329E−04 | 2.2262E−05  | −7.6445E−07 |
| S8  | −1.4003E−01 | 5.8553E−02  | −1.7444E−02 | 3.6134E−03  | −4.9462E−04 | 4.0220E−05  | −1.4710E−06 |
| S9  | 1.0947E−02  | −4.1897E−03 | 1.0717E−03  | −1.8293E−04 | 2.0037E−05  | −1.2746E−06 | 3.5801E−08  |
| S10 | −4.8420E−03 | 1.0078E−03  | −1.4696E−04 | 1.4689E−05  | −9.5816E−07 | 3.6731E−08  | −6.2749E−10 |
| S11 | −1.2670E−03 | 2.0945E−04  | −2.4427E−05 | 1.9626E−06  | −1.0330E−07 | 3.2045E−09  | −4.4403E−11 |
| S12 | −2.3493E−04 | 3.1271E−05  | −2.9216E−06 | 1.8775E−07  | −7.9109E−09 | 1.9695E−10  | −2.1983E−12 |
| S13 | −6.3014E−05 | 5.9381E−06  | −3.9299E−07 | 1.7950E−08  | −5.3990E−10 | 9.6388E−12  | −7.7460E−14 |
| S14 | 1.1602E−05  | −8.9372E−07 | 4.9760E−08  | −1.9438E−09 | 5.0454E−11  | −7.8059E−13 | 5.4432E−15  |

Figure 2A:
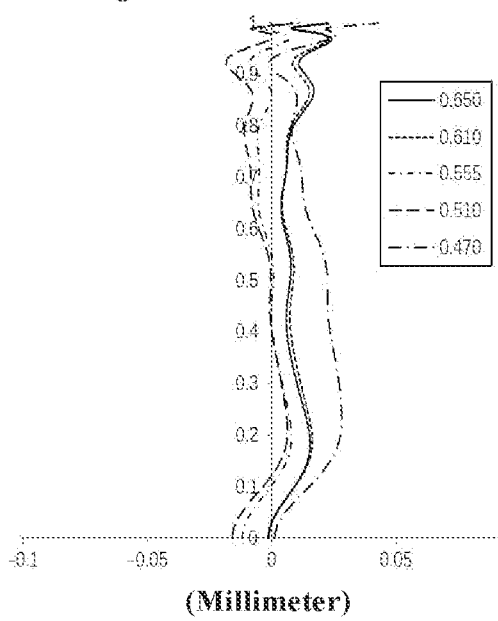
FIG. 2A and FIG. 2B respectively illustrate a longitudinal aberration curve and an astigmatic curve of the optical imaging lens assembly in Embodiment 1.
Figure 2B:
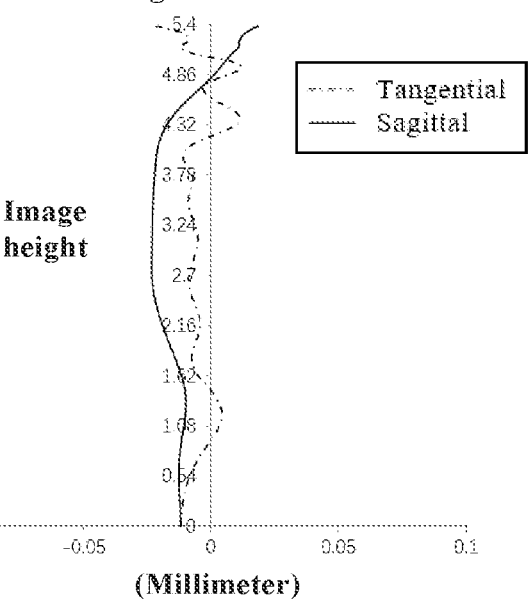

FIG. 2A illustrates a longitudinal aberration curve of the optical imaging lens assembly according to Embodiment 1, representing deviations of focal points of light of different wavelengths converged after passing through the lens assembly. FIG. 2B illustrates an astigmatic curve of the optical imaging lens assembly according to Embodiment 1, representing a curvature of a tangential image plane and a curvature of a sagittal image plane. It can be seen from FIGS. 2A-29 that the optical imaging lens assembly given in Embodiment 1 can achieve a good imaging quality.

Embodiment 2

Figure 3:
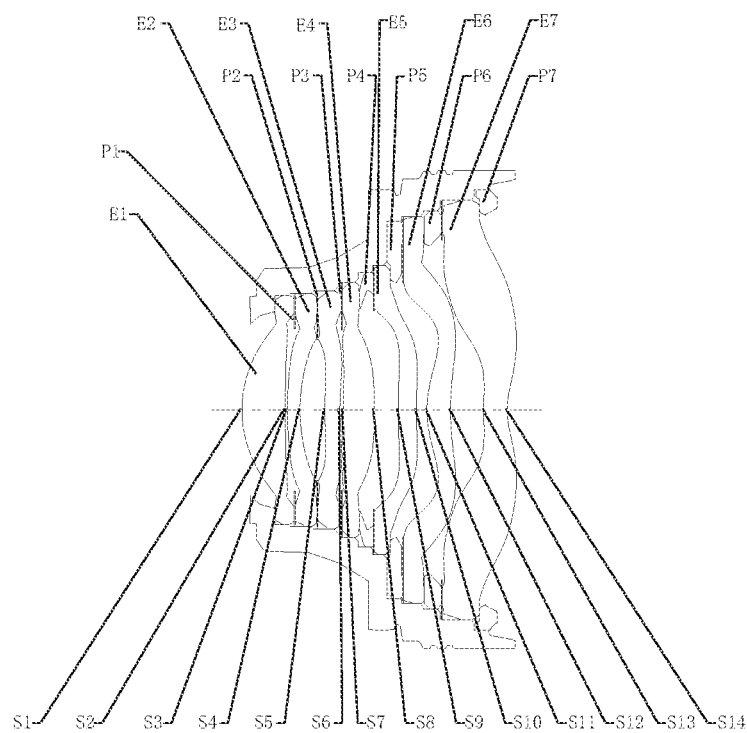
FIG. 3 illustrates a schematic structural diagram of an optical imaging lens assembly according to Embodiment 2 of the present disclosure.

An optical imaging lens assembly according to Embodiment 2 of the present disclosure is described below with reference to FIG. 3. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 3, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter has an object-side surface S15 and an image-side surface S16. Light from an object sequentially passes through the surfaces S1-S16 and finally forms an image on the image plane 17.

In this example, a total effective focal length f of the optical imaging lens assembly is 5.77 mm, a total track length of the optical imaging lens assembly TTL is 7.27 mm, half of a diagonal length ImgH of an effective pixel area on the image plane of the optical imaging lens assembly is 5.38 mm, half of a maximal field-of-view Semi-FOV of the optical imaging lens assembly is 42.37°, and a relative F-number Fno of the optical imaging lens assembly is 1.46.

Table 4 shows a table of basic parameters of the optical imaging lens assembly in Embodiment 2. Here, the units of a radius of curvature, a thickness/distance and a focal length are millimeters (mm). Table 5-1 and Table 5-2 show tables of basic parameters of the lens barrel and the spacing elements in the optical imaging lens assembly of Embodiment 2, where the units of the parameters in Table 5-1 and Table 5-2 are millimeters (mm). Table 6-1 and Table 6-2 show the high-order coefficients applicable to the aspheric surfaces in Embodiment 2. Here, the surface type of each aspheric surface may be defined using the formula (1) given in Embodiment 1.

TABLE 4

| surface number | surface type | radius of curvature | thickness/ distance | refractive index | abbe number | focal length | conic coefficient |
|---|---|---|---|---|---|---|---|
| OBJ | spherical | infinite | infinite | | | | |
| STO | spherical | infinite | −0.2741 | | | | |
| S1 | aspheric | 2.7591 | 1.0022 | 1.54 | 56.1 | 5.75 | 0.0000 |
| S2 | aspheric | 20.0441 | 0.0500 | | | | 0.0000 |
| S3 | aspheric | 6.8379 | 0.2925 | 1.67 | 19.2 | −13.18 | 0.0000 |
| S4 | aspheric | 3.8059 | 0.5767 | | | | 0.0000 |
| S5 | aspheric | 9.9186 | 0.3456 | 1.67 | 19.2 | −27.58 | 0.0000 |
| S6 | aspheric | 6.3883 | 0.0783 | | | | 0.0000 |
| S7 | aspheric | 15.3328 | 0.7232 | 1.54 | 56.1 | 13.29 | 0.0000 |
| S8 | aspheric | −13.5313 | 0.5514 | | | | 0.0000 |
| S9 | aspheric | 14.0527 | 0.4168 | 1.57 | 37.3 | −22.52 | 0.0000 |
| S10 | aspheric | 6.6384 | 0.2072 | | | | 0.0000 |
| S11 | aspheric | 2.3383 | 0.5496 | 1.54 | 56.1 | 6.11 | −0.9946 |
| S12 | aspheric | 7.1730 | 0.7661 | | | | 0.0007 |
| S13 | aspheric | 5.3626 | 0.5445 | 1.54 | 55.6 | −4.93 | 0.0232 |
| S14 | aspheric | 1.7106 | 0.3854 | | | | −1.0010 |
| S15 | spherical | infinite | 0.2100 | 1.52 | 64.2 | | |
| S16 | spherical | infinite | 0.5690 | | | | |
| S17 | spherical | infinite | | | | | |

TABLE 5-1

| D1s | D2m | d3s | D4s | D4m | d5s | d5m | d6s | SD52 |
|---|---|---|---|---|---|---|---|---|
| 5.40 | 5.50 | 3.70 | 6.24 | 6.29 | 6.02 | 6.33 | 7.71 | 2.73 |

TABLE 5-2

| D7s | D7m | ds | d0m | EP01 | EP12 | EP23 | EP45 |
|---|---|---|---|---|---|---|---|
| 10.10 | 9.85 | 3.98 | 10.57 | 1.02 | 0.50 | 0.54 | 0.30 |

TABLE 6-1

| surface number | A4 | A6 | A8 | A10 | A12 | A14 | A16 |
|---|---|---|---|---|---|---|---|
| S1 | −2.3796E−03 | 1.1773E−02 | −3.7353E−02 | 7.5532E−02 | −1.0120E−01 | 9.1085E−02 | −5.4990E−02 |
| S2 | −4.3106E−02 | 8.4869E−02 | −1.4581E−01 | 2.7191E−01 | −4.3462E−01 | 5.0855E−01 | −4.2272E−01 |
| S3 | −5.9726E−02 | 9.6794E−02 | −1.3949E−01 | 2.2354E−01 | −3.2409E−01 | 3.5082E−01 | −2.6619E−01 |
| S4 | −2.3936E−02 | −2.7994E−03 | 1.5007E−01 | −5.7104E−01 | 1.3260E+00 | −2.1119E+00 | 2.3821E+00 |
| S5 | −2.9946E−02 | −1.8655E−03 | −1.8721E−02 | 1.2652E−01 | −3.7664E−01 | 6.5344E−01 | −7.4223E−01 |
| S6 | −2.2628E−02 | −4.8844E−02 | 1.1800E−01 | −1.8315E−01 | 2.0884E−01 | −1.9476E−01 | 1.5207E−01 |
| S7 | −8.9295E−03 | −5.3367E−02 | 1.2176E−01 | −1.9819E−01 | 2.5617E−01 | −2.5935E−01 | 1.9698E−01 |
| S8 | −1.4898E−02 | −2.1165E−02 | 6.0507E−02 | −1.4958E−01 | 2.5388E−01 | −2.9478E−01 | 2.4040E−01 |
| S9 | −2.9052E−03 | −1.3243E−02 | 1.9039E−02 | −1.7445E−02 | −2.9520E−04 | 1.6523E−02 | −1.8300E−02 |
| S10 | −7.2496E−02 | 1.9371E−02 | 2.7104E−02 | −6.1639E−02 | 6.1649E−02 | −3.8613E−02 | 1.6377E−02 |
| S11 | −5.7573E−02 | 5.7320E−03 | 2.5997E−02 | −4.2558E−02 | 3.3398E−02 | −1.6370E−02 | 5.4377E−03 |

TABLE 6-1-continued

| surface number | A4 | A6 | A8 | A10 | A12 | A14 | A16 |
|---|---|---|---|---|---|---|---|
| S12 | 8.9168E−04 | −6.7148E−03 | 1.1017E−02 | −1.5514E−02 | 1.0841E−02 | −4.5175E−03 | 1.2402E−03 |
| S13 | −1.8372E−01 | 6.0799E−02 | −1.5007E−05 | −1.3028E−02 | 7.6155E−03 | −2.3636E−03 | 4.6774E−04 |
| S14 | −2.0017E−01 | 1.0631E−01 | −4.6929E−02 | 1.6012E−02 | −4.0998E−03 | 7.8142E−04 | −1.1065E−04 |

TABLE 6-2

| surface number | A18 | A20 | A22 | A24 | A26 | A28 | A30 |
|---|---|---|---|---|---|---|---|
| S1 | 2.1567E−02 | −4.8760E−03 | 2.8041E−04 | 1.7180E−04 | −5.3121E−05 | 6.5684E−06 | −3.1658E−07 |
| S2 | 2.5063E−01 | −1.0635E−01 | 3.2069E−02 | −6.7107E−03 | 9.2654E−04 | −7.5894E−05 | 2.7926E−06 |
| S3 | 1.3903E−01 | −4.8804E−02 | 1.0822E−02 | −1.2475E−03 | −5.3841E−07 | 1.7246E−05 | −1.3963E−06 |
| S4 | −1.9264E+00 | 1.1188E+00 | −4.6212E−01 | 1.3237E−01 | −2.4980E−02 | 2.7919E−03 | −1.3996E−04 |
| S5 | 5.7932E−01 | −3.1655E−01 | 1.2098E−01 | −3.1671E−02 | 5.4051E−03 | −5.4065E−04 | 2.3972E−05 |
| S6 | −9.6024E−02 | 4.6855E−02 | −1.6925E−02 | 4.3188E−03 | −7.2968E−04 | 7.2795E−05 | −3.2341E−06 |
| S7 | −1.0862E−01 | 4.2831E−02 | −1.1939E−02 | 2.3027E−03 | −2.9329E−04 | 2.2262E−05 | −7.6445E−07 |
| S8 | −1.4003E−01 | 5.8553E−02 | −1.7444E−02 | 3.6134E−03 | −4.9462E−04 | 4.0220E−05 | −1.4710E−06 |
| S9 | 1.0947E−02 | −4.1897E−03 | 1.0717E−03 | −1.8293E−04 | 2.0037E−05 | −1.2746E−06 | 3.5801E−08 |
| S10 | −4.8420E−03 | 1.0078E−03 | −1.4696E−04 | 1.4689E−05 | −9.5816E−07 | 3.6731E−08 | −6.2749E−10 |
| S11 | −1.2670E−03 | 2.0945E−04 | −2.4427E−05 | 1.9626E−06 | −1.0330E−07 | 3.2045E−09 | −4.4403E−11 |
| S12 | −2.3493E−04 | 3.1271E−05 | −2.9216E−06 | 1.8775E−07 | −7.9109E−09 | 1.9695E−10 | −2.1983E−12 |
| S13 | −6.3014E−05 | 5.9381E−06 | −3.9299E−07 | 1.7950E−08 | −5.3990E−10 | 9.6388E−12 | −7.7460E−14 |
| S14 | 1.1602E−05 | −8.9372E−07 | −4.9760E−08 | −1.9438E−09 | 5.0454E−11 | −7.8059E−13 | 5.4432E−15 |

Figure 4A:
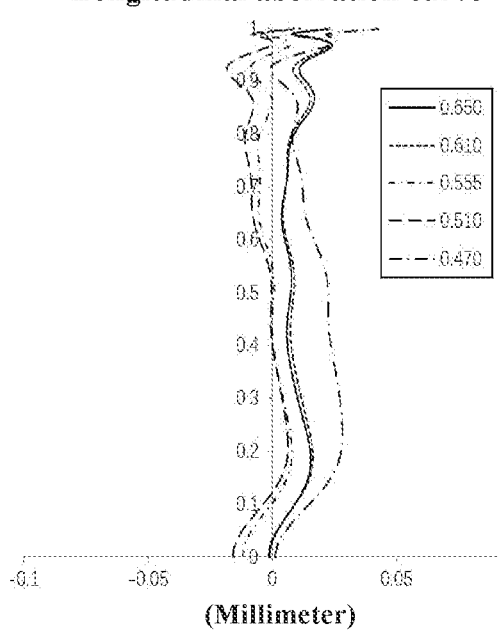
FIG. 4A and FIG. 4B respectively illustrate a longitudinal aberration curve and an astigmatic curve of the optical imaging lens assembly in Embodiment 2.
Figure 4B:
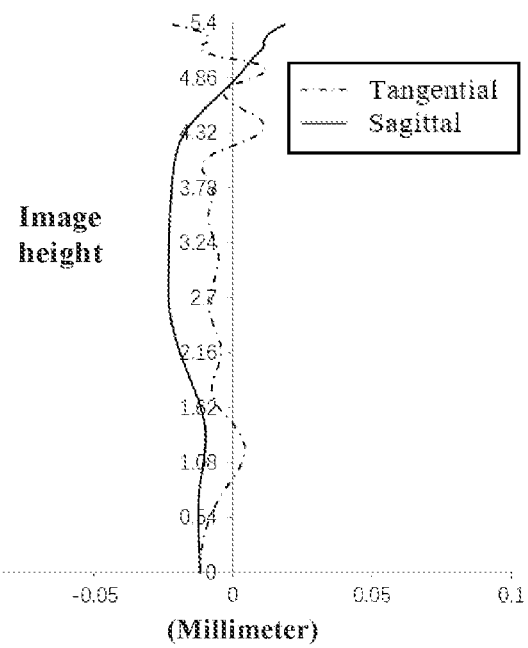

FIG. 4A illustrates a longitudinal aberration curve of the optical imaging lens assembly according to Embodiment 2, representing deviations of focal points of light of different wavelengths converged after passing through the lens assembly. FIG. 4B illustrates an astigmatic curve of the optical imaging lens assembly according to Embodiment 2, representing a curvature of a tangential image plane and a curvature of a sagittal image plane. It can be seen from FIGS. 4A-49 that the optical imaging lens assembly given in Embodiment 2 can achieve a good imaging quality.

Embodiment 3

Figure 5:
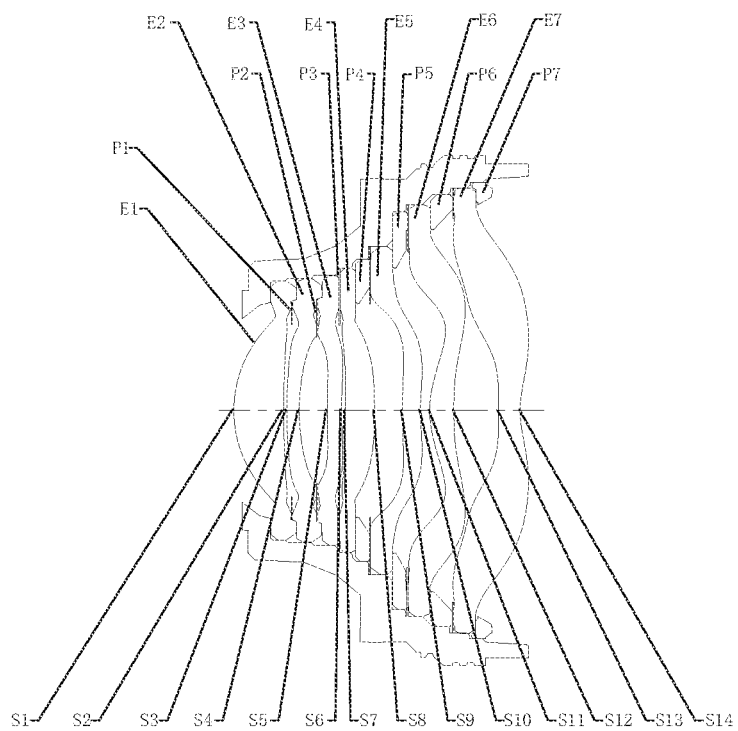
FIG. 5 illustrates a schematic structural diagram of an optical imaging lens assembly according to Embodiment 3 of the present disclosure.

An optical imaging lens assembly according to Embodiment 3 of the present disclosure is described below with reference to FIG. 5. FIG. 5 is a schematic structural diagram of the optical imaging lens assembly according to Embodiment 3 of the present disclosure.

As shown in FIG. 5, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 5, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter has an object-side surface S15 and an image-side surface S16. Light from an object sequentially passes through the surfaces S1-S16 and finally forms an image on the image plane 17.

In this example, a total effective focal length f of the optical imaging lens assembly is 6.32 mm, a total track length of the optical imaging lens assembly TTL is 7.88 mm, half of a diagonal length ImgH of an effective pixel area on the image plane of the optical imaging lens assembly is 5.83 mm, half of a maximal field-of-view Semi-FOV of the optical imaging lens assembly is 41.82°, and a relative F-number Fno of the optical imaging lens assembly is 1.46.

Table 7 shows a table of basic parameters of the optical imaging lens assembly in Embodiment 3. Here, the units of a radius of curvature, a thickness/distance and a focal length are millimeters (mm). Table 8-1 and Table 8-2 show tables of basic parameters of the lens barrel and the spacing elements in the optical imaging lens assembly of Embodiment 3, where the units of the parameters in Table 8-1 and Table 8-2 are millimeters (mm). Table 9-1 and Table 9-2 show the high-order coefficients applicable to the aspheric surfaces in Embodiment 3. Here, the surface type of each aspheric surface may be defined using the formula (1) given in Embodiment 1.

TABLE 7

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| STO | spherical | infinite | −0.2567 | | | | |
| S1 | aspheric | 2.8892 | 1.1701 | 1.54 | 56.1 | 6.35 | 0.0000 |
| S2 | aspheric | 14.8686 | 0.0746 | | | | 0.0000 |
| S3 | aspheric | 8.7721 | 0.2934 | 1.67 | 19.2 | −16.21 | 0.0000 |
| S4 | aspheric | 4.8118 | 0.6555 | | | | 0.0000 |
| S5 | aspheric | 12.8365 | 0.3352 | 1.67 | 19.2 | −28.28 | 0.0000 |
| S6 | aspheric | 7.6056 | 0.0859 | | | | 0.0000 |
| S7 | aspheric | 22.6416 | 0.6924 | 1.54 | 56.1 | 17.04 | 0.0000 |
| S8 | aspheric | −15.6024 | 0.6532 | | | | 0.0000 |
| S9 | aspheric | 9.2982 | 0.4253 | 1.57 | 37.3 | −15.97 | 0.0000 |
| S10 | aspheric | 4.5242 | 0.2195 | | | | 0.1497 |
| S11 | aspheric | 2.4367 | 0.5671 | 1.54 | 56.1 | 5.26 | −0.9958 |
| S12 | aspheric | 14.8950 | 1.0480 | | | | 0.0000 |
| S13 | aspheric | 22.1025 | 0.5117 | 1.54 | 55.6 | −4.87 | 0.0000 |
| S14 | aspheric | 2.3198 | 0.4090 | | | | −1.0000 |
| S15 | spherical | infinite | 0.2100 | 1.52 | 64.2 | | |
| S16 | spherical | infinite | 0.5290 | | | | |
| S17 | spherical | infinite | | | | | |

TABLE 8-1

| D1s | D2m | d3s | D4s | D4m | d5s | d5m | d6s | SD52 |
|---|---|---|---|---|---|---|---|---|
| 5.17 | 5.27 | 4.04 | 6.95 | 7.08 | 6.78 | 7.59 | 8.59 | 3.05 |

TABLE 8-2

| D7s | D7m | ds | d0m | EP01 | EP12 | EP23 | EP45 |
|---|---|---|---|---|---|---|---|
| 10.72 | 10.53 | 4.36 | 11.12 | 1.15 | 0.58 | 0.51 | 0.55 |

TABLE 9-1

| surface number | A4 | A6 | A8 | A10 | A12 | A14 | A16 |
|---|---|---|---|---|---|---|---|
| S1 | −1.1982E−03 | 8.4023E−03 | −2.6304E−02 | 5.3575E−02 | −7.3798E−02 | 7.0816E−02 | −4.8263E−02 |
| S2 | −2.3434E−02 | 1.5713E−02 | 9.6275E−03 | −4.0572E−02 | 5.9963E−02 | −5.6693E−02 | 3.7171E−02 |
| S3 | −3.5575E−02 | 3.1616E−02 | 1.8108E−02 | −2.0540E−02 | 1.8575E−02 | −1.1688E−02 | 1.8575E−02 |
| S4 | −1.5657E−02 | 1.1895E−02 | 1.8868E−03 | −1.2812E−02 | 1.5611E−02 | −1.0704E−02 | 4.1777E−03 |
| S5 | −2.8675E−02 | 1.4719E−02 | −4.3948E−02 | 9.1077E−02 | −1.4393E−01 | 1.6245E−01 | −1.3016E−01 |
| S6 | −4.1189E−02 | 3.9634E−02 | −8.0499E−02 | 1.2735E−01 | −1.5156E−01 | 1.2901E−01 | −7.7574E−02 |
| S7 | −3.5120E−02 | 3.9147E−02 | −8.0326E−02 | 1.3184E−01 | −1.5394E−01 | 1.2374E−01 | −6.7605E−02 |
| S8 | −1.9594E−02 | −1.2952E−02 | 5.3689E−02 | −1.1824E−01 | 1.6535E−01 | −1.5780E−01 | 1.0663E−01 |
| S9 | −3.9805E−02 | 2.2467E−02 | −9.3157E−03 | −1.6577E−04 | 2.2779E−03 | −1.4754E−03 | 4.8961E−04 |
| S10 | −1.0374E−01 | 4.2273E−02 | −1.3200E−02 | 3.1298E−03 | −1.2034E−03 | 5.3078E−04 | −1.5507E−04 |
| S11 | −3.2027E−02 | 1.0703E−03 | 3.2483E−04 | 1.7955E−04 | −2.1888E−04 | 6.6220E−05 | −1.0016E−05 |
| S12 | 4.5584E−02 | −1.8544E−02 | −1.7579E−03 | 4.7452E−03 | −2.3088E−03 | 6.3928E−04 | −1.1675E−04 |
| S13 | −1.0100E−01 | 4.0354E−02 | −1.7234E−02 | 6.1322E−03 | −1.4528E−03 | 2.3131E−04 | −2.5837E−05 |
| S14 | −1.1404E−01 | 4.9693E−02 | −1.9301E−02 | 5.7014E−03 | −1.2167E−03 | 1.8772E−04 | −2.1174E−05 |

TABLE 9-2

| surface number | A18 | A20 | A22 | A24 | A26 | A28 | A30 |
|---|---|---|---|---|---|---|---|
| S1 | 2.3600E−02 | −8.2866E−03 | 2.0680E−03 | −3.5746E−04 | 4.0637E−05 | −2.7305E−06 | 8.2102E−08 |
| S2 | −1.7217E−02 | 5.6280E−03 | −1.2788E−03 | 1.9535E−04 | −1.8832E−05 | 1.0086E−06 | −2.1752E−08 |
| S3 | 5.1318E−03 | −1.5872E−03 | 3.4285E−04 | −4.9617E−05 | 4.3307E−06 | −1.7173E−07 | 0.0000E+00 |
| S4 | −5.6245E−04 | −2.5105E−04 | 1.3685E−04 | −2.6080E−05 | 1.8550E−06 | 0.0000E+00 | 0.0000E+00 |
| S5 | 7.3892E−02 | −2.9457E−02 | 8.0571E−03 | −1.4390E−03 | 1.5109E−04 | −7.0712E−06 | 0.0000E+00 |
| S6 | 3.2962E−02 | −9.8498E−03 | 2.0295E−03 | −2.7506E−04 | 2.2111E−05 | −8.0014E−07 | 0.0000E+00 |
| S7 | 2.4898E−02 | −6.0142E−03 | 8.7374E−04 | −5.3097E−05 | −3.9164E−06 | 8.5747E−07 | −4.1609E−08 |
| S8 | −5.1858E−02 | 1.8216E−02 | 4.5799E−03 | 8.0365E−04 | −9.3452E−05 | 6.4693E−06 | −2.0174E−07 |
| S9 | −5.9259E−05 | −1.8461E−05 | 9.8585E−06 | −2.0768E−06 | 2.4050E−07 | −1.5000E−08 | 3.9466E−10 |
| S10 | 2.8550E−05 | −3.3467E−06 | 2.4362E−07 | −1.0058E−08 | 1.8008E−10 | 0.0000E+00 | 0.0000E+00 |
| S11 | 8.8463E−07 | −4.7552E−08 | 1.5198E−09 | −2.6041E−11 | 1.7610E−13 | 0.0000E+00 | 0.0000E+00 |
| S12 | 1.4825E−05 | −1.3356E−06 | 8.5368E−08 | −3.7937E−09 | 1.1162E−10 | −1.9561E−12 | 1.5461E−14 |
| S13 | 2.0859E−06 | −1.2327E−07 | 5.3088E−09 | −1.6269E−10 | 3.3667E−12 | −4.2203E−14 | 2.4203E−16 |
| S14 | 1.7569E−06 | −1.0694E−07 | 4.7095E−09 | −1.4577E−10 | 3.0030E−12 | −3.6929E−14 | 2.0490E−16 |

Figure 6A:
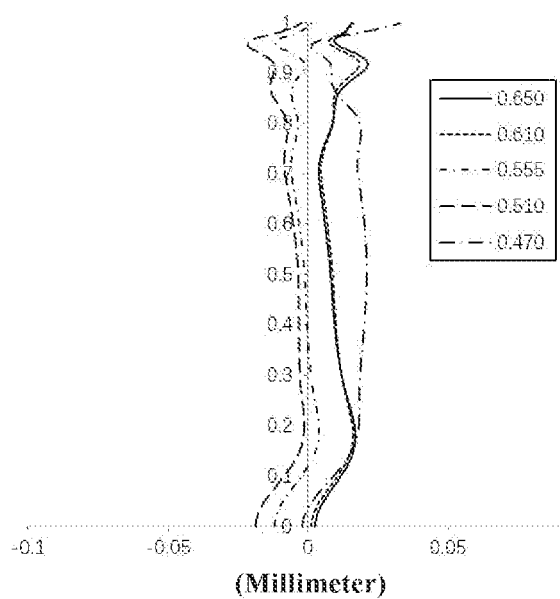
FIG. 6A and FIG. 6B respectively illustrate a longitudinal aberration curve and an astigmatic curve of the optical imaging lens assembly in Embodiment 3.
Figure 6B:
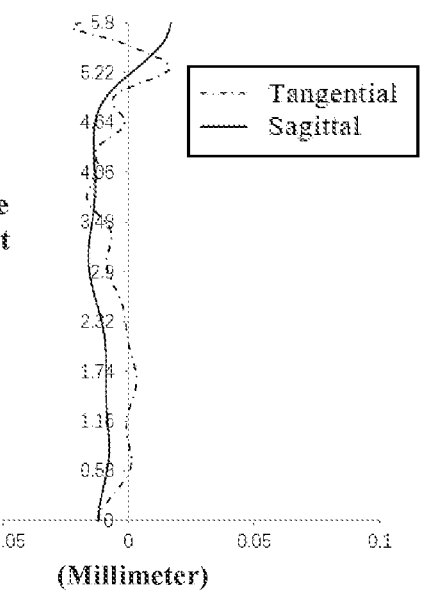

FIG. 6A illustrates a longitudinal aberration curve of the optical imaging lens assembly according to Embodiment 3, representing deviations of focal points of light of different wavelengths converged after passing through the lens assembly. FIG. 6B illustrates an astigmatic curve of the optical imaging lens assembly according to Embodiment 3, representing a curvature of a tangential image plane and a curvature of a sagittal image plane. It can be seen from FIGS. 6A-6B that the optical imaging lens assembly given in Embodiment 3 can achieve a good imaging quality.

Embodiment 4

Figure 7:
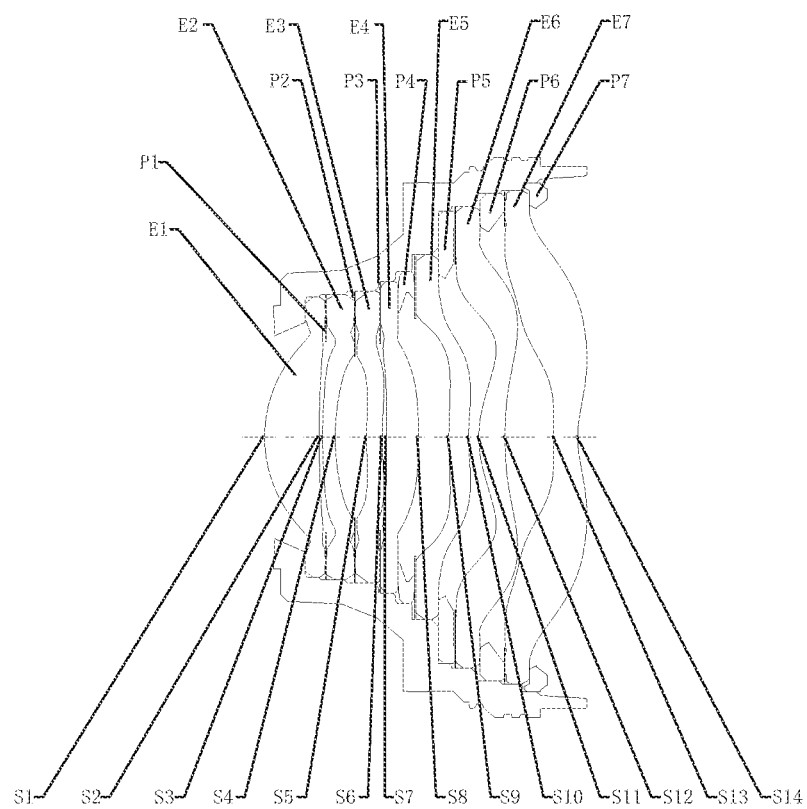
FIG. 7 illustrates a schematic structural diagram of an optical imaging lens assembly according to Embodiment 4 of the present disclosure.

An optical imaging lens assembly according to Embodiment 4 of the present disclosure is described below with reference to FIG. 7. FIG. 7 is a schematic structural diagram of the optical imaging lens assembly according to Embodiment 4 of the present disclosure.

As shown in FIG. 7, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 7, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter has an object-side surface S15 and an image-side surface S16. Light from an object sequentially passes through the surfaces S1-S16 and finally forms an image on the image plane 17.

In this example, a total effective focal length f of the optical imaging lens assembly is 6.32 mm, a total track length of the optical imaging lens assembly TTL is 7.88 mm, half of a diagonal length ImgH of an effective pixel area on the image plane of the optical imaging lens assembly is 5.83 mm, half of a maximal field-of-view Semi-FOV of the optical imaging lens assembly is 41.82°, and a relative F-number Fno of the optical imaging lens assembly is 1.46.

Table 10 shows a table of basic parameters of the optical imaging lens assembly in Embodiment 4. Here, the units of a radius of curvature, a thickness/distance and a focal length are millimeters (mm). Table 11-1 and Table 11-2 show tables of basic parameters of the lens barrel and the spacing elements in the optical imaging lens assembly of Embodiment 4, where the units of the parameters in Table 11-1 and Table 11-2 are millimeters (mm). Table 12-1 and Table 12-2 show the high-order coefficients applicable to the aspheric surfaces in Embodiment 4. Here, the surface type of each aspheric surface may be defined using the formula (1) given in Embodiment 1.

TABLE 10

| surface number | surface type | radius of curvature | thickness/ distance | material refractive index | abbe number | focal length | comic coefficient |
|---|---|---|---|---|---|---|---|
| OBJ | spherical | infinite | infinite | | | | |
| STO | spherical | infinite | −0.2567 | | | | |
| S1 | aspheric | 2.8892 | 1.1701 | 1.54 | 56.1 | 6.35 | 0.0000 |
| S2 | aspheric | 14.8686 | 0.0746 | | | | 0.0000 |
| S3 | aspheric | 8.7721 | 0.2934 | 1.67 | 19.2 | −16.21 | 0.0000 |
| S4 | aspheric | 4.8118 | 0.6555 | | | | 0.0000 |
| S5 | aspheric | 12.8365 | 0.3352 | 1.67 | 19.2 | −28.28 | 0.0000 |
| S6 | aspheric | 7.6056 | 0.0859 | | | | 0.0000 |
| S7 | aspheric | 22.6416 | 0.6924 | 1.54 | 56.1 | 17.04 | 0.0000 |
| S8 | aspheric | −15.6024 | 0.6532 | | | | 0.0000 |
| S9 | aspheric | 9.2982 | 0.4253 | 1.57 | 37.3 | −15.97 | 0.0000 |
| S10 | aspheric | 4.5242 | 0.2195 | | | | 0.1497 |
| S11 | aspheric | 2.4367 | 0.5671 | 1.54 | 56.1 | 5.26 | −0.9958 |
| S12 | aspheric | 14.8950 | 1.0480 | | | | 0.0000 |
| S13 | aspheric | 22.1025 | 0.5117 | 1.54 | 55.6 | −4.87 | 0.0000 |
| S14 | aspheric | 2.3198 | 0.4090 | | | | −1.0000 |
| S15 | spherical | infinite | 0.2100 | 1.52 | 64.2 | | |
| S16 | spherical | infinite | 0.5290 | | | | |
| S17 | spherical | infinite | | | | | |

TABLE 11-1

| D1s | D2m | d3s | D4s | D4m | d5s | d5m | d6s | SD52 |
|---|---|---|---|---|---|---|---|---|
| 6.16 | 6.30 | 4.03 | 6.98 | 6.93 | 7.02 | 7.49 | 9.14 | 3.05 |

TABLE 11-2

| D7s | D7m | ds | d0m | EP01 | EP12 | EP23 | EP45 |
|---|---|---|---|---|---|---|---|
| 10.90 | 10.71 | 4.37 | 11.30 | 1.09 | 0.61 | 0.52 | 0.51 |

TABLE 12-1

| surface number | A4 | A6 | A8 | A10 | A12 | A14 | A16 |
|---|---|---|---|---|---|---|---|
| S1 | −1.1982E−03 | 8.4023E−03 | −2.6304E−02 | 5.3575E−02 | −7.3798E−02 | 7.0816E−02 | −4.8263E−02 |
| S2 | −2.3434E−02 | 1.5713E−02 | 9.6275E−03 | −4.0572E−02 | 5.9963E−02 | −5.6693E−02 | 3.7171E−02 |
| S3 | −3.5575E−02 | 3.1616E−02 | −2.0382E−02 | 1.8108E−02 | −2.0540E−02 | 1.8575E−02 | −1.1688E−02 |
| S4 | −1.5657E−02 | 1.1895E−02 | 1.8868E−03 | −1.2812E−02 | 1.5611E−02 | −1.0704E−02 | 4.1777E−03 |
| S5 | −2.8675E−02 | 1.4719E−02 | −4.3948E−02 | 9.1077E−02 | −1.4393E−01 | 1.6245E−01 | −1.3016E−01 |
| S6 | −4.1189E−02 | 3.9634E−02 | −8.0499E−02 | 1.2735E−01 | −1.5156E−01 | 1.2901E−01 | −7.7574E−02 |
| S7 | −3.5120E−02 | 3.9147E−02 | −8.0326E−02 | 1.3184E−01 | −1.5394E−01 | 1.2374E−01 | −6.7605E−02 |
| S8 | −1.9594E−02 | −1.2952E−02 | 5.3689E−02 | −1.1824E−01 | 1.6535E−01 | −1.5780E−01 | 1.0663E−01 |
| S9 | −3.9805E−02 | 2.2467E−02 | −9.3157E−03 | −1.6577E−04 | 2.2779E−03 | −1.4754E−03 | 4.8961E−04 |
| S10 | −1.0374E−01 | 4.2273E−02 | −1.3200E−02 | 3.1298E−03 | −1.2034E−03 | 5.3078E−04 | −1.5507E−04 |
| S11 | −3.2027B−02 | 1.0703E−03 | 3.2483E−04 | 1.7955E−04 | −2.1888E−04 | 6.6220E−05 | −1.0016E−05 |
| S12 | 4.5584E−02 | −1.8544E−02 | −1.7579E−03 | 4.7452E−03 | −2.3088E−03 | 6.3928E−04 | −1.1675E−04 |
| S13 | −1.0100E−01 | 4.0354E−02 | −1.7234E−02 | 6.1322E−03 | −1.4528E−03 | 2.3131E−04 | −2.5837E−05 |
| S14 | −1.1404E−01 | 4.9693E−02 | −1.9301E−02 | 5.7014E−03 | −1.2167E−03 | 1.8772E−04 | −2.1174E−05 |

TABLE 12-2

| surface number | A18 | A20 | A22 | A24 | A26 | A28 | A30 |
|---|---|---|---|---|---|---|---|
| S1 | 2.3600E−02 | −8.2866E−03 | 2.0680E−03 | −3.5746E−04 | 4.0637E−05 | −2.7305E−06 | 8.2102E−08 |
| S2 | −1.7217E−02 | 5.6280E−03 | −1.2788E−03 | 1.9535E−04 | −1.8832E−05 | 1.0086E−06 | −2.1752E−08 |
| S3 | 5.1318E−03 | −1.5872E−03 | 3.4285E−04 | −4.9617E−05 | 4.3307E−06 | −1.7173E−07 | 0.0000E+00 |
| S4 | −5.6245E−04 | −2.5105E−04 | 1.3685E−04 | −2.6080E−05 | 1.8550E−06 | 0.0000E+00 | 0.0000E+00 |
| S5 | 7.3892E−02 | −2.9457E−02 | 8.0571E−03 | −1.4390E−03 | 1.5109E−04 | −7.0712E−06 | 0.0000E+00 |
| S6 | 3.2962E−02 | −9.8498E−03 | 2.0295E−03 | −2.7506E−04 | 2.2111E−05 | −8.0014E−07 | 0.0000E+00 |
| 57 | 2.4898E−02 | −6.0142E−03 | 8.7374E−04 | −5.3097E−05 | −3.9164E−06 | 8.5747E−07 | −4.1609E−08 |
| S8 | −5.1858E−02 | 1.8216E−02 | −4.5799E−03 | 8.0365E−04 | −9.3452E−05 | 6.4693E−06 | −2.0174E−07 |
| S9 | −5.9259E−05 | −1.8461E−05 | 9.8585E−06 | −2.0768E−06 | 2.4050E−07 | −1.5000E−08 | 3.9466E−10 |
| S10 | 2.8550E−05 | −3.3467E−06 | 2.4362E−07 | −1.0058E−08 | 1.8008E−10 | 0.0000E+00 | 0.0000E+00 |
| S11 | 8.8463E−07 | −4.7552E−08 | 1.5198E−09 | −2.6041E−11 | 1.7610E−13 | 0.0000E+00 | 0.0000E+00 |
| S12 | 1.4825E−05 | −1.3356E−06 | 8.5368E−08 | −3.7937E−09 | 1.1162E−10 | −1.9561E−12 | 1.5461E−14 |
| S13 | 2.0859E−06 | −1.2327E−07 | 5.3088E−09 | −1.6269E−10 | 3.3667E−12 | −4.2203E−14 | 2.4203E−16 |
| S14 | 1.7569E−06 | −1.0694E−07 | 4.7095E−09 | −1.4577E−10 | 3.0030E−12 | −3.6929E−14 | 2.0490E−16 |

Figures 8A, 8B:
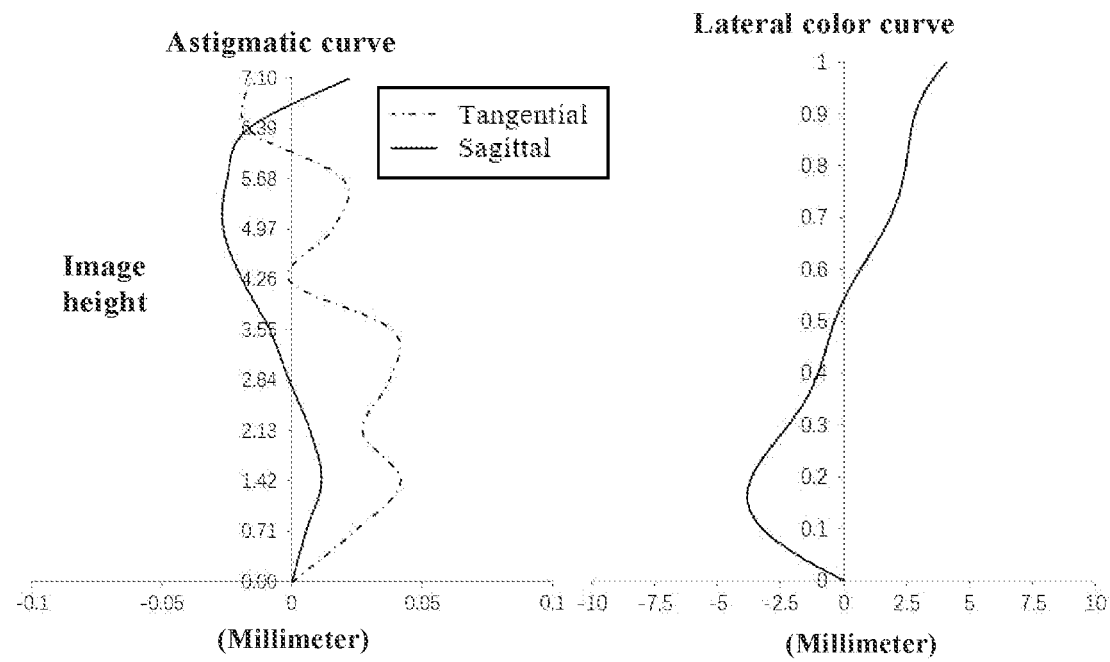
FIG. 8A and FIG. 8B respectively illustrate a longitudinal aberration curve and an astigmatic curve of the optical imaging lens assembly in Embodiment 4.

FIG. 8A illustrates a longitudinal aberration curve of the optical imaging lens assembly according to Embodiment 4, representing deviations of focal points of light of different wavelengths converged after passing through the lens assembly. FIG. 8B illustrates an astigmatic curve of the optical imaging lens assembly according to Embodiment 4, representing a curvature of a tangential image plane and a curvature of a sagittal image plane. It can be seen from FIGS. 8A-8B that the optical imaging lens assembly given in Embodiment 4 can achieve a good imaging quality.

Embodiment 5

Figure 9:
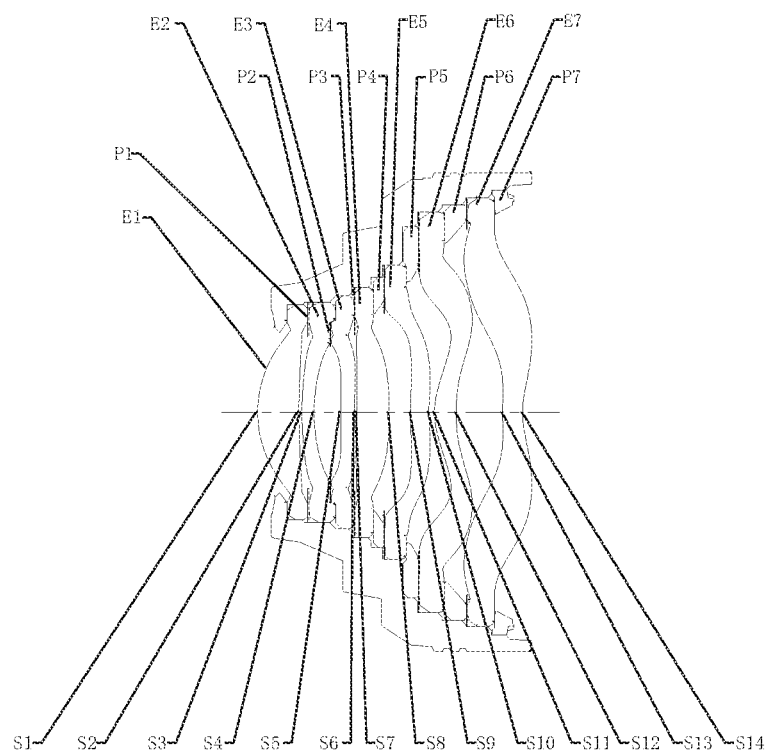
FIG. 9 illustrates a schematic structural diagram of an optical imaging lens assembly according to Embodiment 5 of the present disclosure.

An optical imaging lens assembly according to Embodiment 5 of the present disclosure is described below with reference to FIG. 9. FIG. 9 is a schematic structural diagram of the optical imaging lens assembly according to Embodiment 5 of the present disclosure.

As shown in FIG. 9, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 9, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter (not shown) has an object-side surface S15 and an image-side surface S16. Light from an object sequentially passes through the surfaces S1-S16 and finally forms an image on the image plane 17.

In this example, a total effective focal length f of the optical imaging lens assembly is 5.46 mm, a total track length of the optical imaging lens assembly TTL is 6.95 mm, half of a diagonal length ImgH of an effective pixel area on the image plane of the optical imaging lens assembly is 5.32 mm, half of a maximal field-of-view Semi-FOV of the optical imaging lens assembly is 43.54°, and a relative F-number Fno of the optical imaging lens assembly is 1.50.

Table 13 shows a table of basic parameters of the optical imaging lens assembly in Embodiment 5. Here, the units of a radius of curvature, a thickness/distance and a focal length are millimeters (mm). Table 14-1 and Table 14-2 show tables of basic parameters of the lens barrel and the spacing elements in the optical imaging lens assembly of Embodiment 5, where the units of the parameters in Table 14-1 and Table 14-2 are millimeters (mm). Table 15-1 and Table 15-2 show the high-order coefficients applicable to the aspheric surfaces in Embodiment 5. Here, the surface type of each aspheric surface may be defined using the formula (1) given in Embodiment 1.

TABLE 13

| surface number | surface type | radius of curvature | thickness/ distance | material refractive index | abbe number | focal length | conic coefficient |
| --- | --- | --- | --- | --- | --- | --- | --- |
| OBJ | spherical | infinite | infinite | | | | |
| STO | spherical | infinite | −0.5000 | | | | |
| S1 | aspheric | 2.5949 | 0.9285 | 1.54 | 56.1 | 6.01 | 0.0000 |
| S2 | aspheric | 10.8566 | 0.0713 | | | | 0.0000 |
| S3 | aspheric | 5.9313 | 0.2750 | 1.67 | 19.2 | −17.82 | 0.0000 |
| S4 | aspheric | 3.9027 | 0.5996 | | | | 0.0000 |
| S5 | aspheric | 15.6871 | 0.3100 | 1.67 | 19.2 | −33.84 | 0.0000 |
| S6 | aspheric | 9.2407 | 0.0610 | | | | 0.0000 |
| S7 | aspheric | 56.2646 | 0.7269 | 1.54 | 56.1 | 14.68 | 0.0000 |
| S8 | aspheric | −9.2938 | 0.4863 | | | | 0.0000 |
| S9 | aspheric | 14.8292 | 0.4095 | 1.57 | 37.3 | −8.38 | 0.0000 |
| S10 | aspheric | 3.5799 | 0.1275 | | | | 0.0000 |
| S11 | aspheric | 1.6643 | 0.4902 | 1.54 | 56.1 | 4.20 | −1.0000 |
| S12 | aspheric | 5.4394 | 1.0490 | | | | 0.0000 |
| S13 | aspheric | 9.0296 | 0.4500 | 1.54 | 55.6 | −4.81 | 0.0000 |
| S14 | aspheric | 1.9747 | 0.2634 | | | | −1.0000 |
| S15 | spherical | infinite | 0.2100 | 1.52 | 64.2 | | |
| S16 | spherical | infinite | 0.4910 | | | | |
| S17 | spherical | infinite | | | | | |

TABLE 14-1

| D1s | D2m | d3s | D4m | D4m | D4s | d5m | d6s | SD52 |
| --- | --- | --- | --- | --- | --- | --- | --- | --- |
| 5.00 | 4.11 | 3.54 | 5.94 | 6.08 | 5.93 | 6.58 | 7.74 | 2.75 |

TABLE 14-2

| D7s | D7m | ds | D0m | EP01 | EP12 | EP23 | EP45 |
| --- | --- | --- | --- | --- | --- | --- | --- |
| 10.06 | 9.86 | 3.65 | 10.42 | 0.82 | 0.48 | 0.53 | 0.41 |

TABLE 15-1

| surface number | A4 | A6 | A8 | A10 | A12 | A14 | A16 |
| --- | --- | --- | --- | --- | --- | --- | --- |
| S1 | −5.2436E−03 | 3.2330E−02 | −1.2077E−01 | 3.0007E−01 | −5.1551E−01 | 6.2846E−01 | −5.5297E−01 |
| S2 | −3.8937E−02 | 4.4313E−02 | −3.3599E−02 | 1.0616E−02 | 2.3091E−02 | −6.1541E−02 | 8.4242E−02 |
| S3 | −5.3517E−02 | 6.5897E−02 | −9.7803E−02 | 2.2881E−01 | −4.7966E−01 | 7.2212E−01 | −7.6641E−01 |
| S4 | −1.8091E−02 | −1.6053E−02 | 2.3074E−01 | −9.1857E−01 | 2.3379E+00 | −4.1282E+00 | 5.1989E+00 |
| S5 | −3.6967E−02 | 1.3544E−02 | −1.3360E−01 | 5.8253E−01 | −1.5889E+00 | 2.9037E+00 | −3.7108E+00 |
| S6 | −1.4434E−02 | −6.9903E−02 | 1.4758E−01 | −2.0670E−01 | 2.0132E−01 | −1.8288E−01 | 1.9942E−01 |
| S7 | 7.3435E−03 | −3.6083E−02 | −2.0930E−02 | 2.5025E−01 | −6.0304E−01 | 8.2247E−01 | −7.3225E−01 |
| S8 | −1.1144E−02 | −2.4895E−02 | 7.7747E−02 | −1.7358E−01 | 2.5958E−01 | −2.6953E−01 | 2.0025E−01 |
| S9 | −4.2649E−02 | 4.4917E−02 | −3.1588E−02 | 5.3854E−03 | 8.9667E−03 | −7.9103E−03 | 1.9661E−03 |
| S10 | −2.4496E−01 | 2.2012E−01 | −1.5833E−01 | 8.6605E−02 | −3.3980E−02 | 8.2108E−03 | −5.6060E−04 |
| S11 | −1.4038E−01 | 1.0277E−01 | −7.6305E−02 | 4.3169E−02 | −1.8348E−02 | 5.7131E−03 | −1.2879E−03 |
| S12 | 8.0480E−02 | −7.2676E−02 | 3.8369E−02 | −1.5443E−02 | 4.6486E−03 | −1.0431E−03 | 1.7660E−04 |
| S13 | −1.3811E−01 | 6.0293E−02 | −2.0586E−02 | 5.3732E−03 | −9.8638E−04 | 1.2516E−04 | −1.1022E−05 |
| S14 | −1.5650E−01 | 7.8127E−02 | −3.2699E−02 | 1.0401E−02 | −2.4529E−03 | 4.2646E−04 | −5.4769E−05 |

TABLE 15-2

| surface number | A18 | A20 | A22 | A24 | A26 | A28 | A30 |
|---|---|---|---|---|---|---|---|
| S1 | 3.5401E−01 | −1.6473E−01 | 5.5059E−02 | −1.2864E−02 | 1.9927E−03 | −1.8376E−04 | 7.6312E−06 |
| S2 | −7.5565E−02 | 4.6293E−02 | −1.9461E−02 | 5.5191E−03 | −1.0085E−03 | 1.0714E−04 | −5.0254E−06 |
| S3 | 5.7913E−01 | −3.1292E−01 | 1.2002E−01 | −3.1914E−02 | 5.5967E−03 | −5.8260E−04 | 2.7295E−05 |
| S4 | −4.7230E+00 | 3.0966E+00 | −1.4492E+00 | 4.7147E−01 | −1.0119E−01 | 1.2872E−02 | −7.3459E−04 |
| S5 | 3.3848E+00 | −2.2161E+00 | 1.0332E+00 | −3.3466E−01 | 7.1560E−02 | −9.0794E−03 | 5.1749E−04 |
| S6 | −2.0447E−01 | 1.5357E−01 | −7.8555E−02 | 2.6672E−02 | −5.7647E−03 | 7.1923E−04 | −3.9484E−05 |
| S7 | 4.4938E−01 | −1.9431E−01 | 5.9230E−02 | −1.2474E−02 | 1.7285E−03 | −1.4181E−04 | 5.2174E−06 |
| S8 | −1.0811E−01 | 4.2557E−02 | −1.2108E−02 | 2.4278E−03 | −3.2579E−04 | 2.6282E−05 | −9.6428E−07 |
| S9 | 9.1436E−04 | −9.0919E−04 | 3.4675E−04 | −7.5988E−05 | 9.9852E−06 | −7.3329E−07 | 2.3187E−08 |
| S10 | −3.6896E−04 | 1.5378E−04 | −3.0859E−05 | 3.7555E−06 | −2.8116E−07 | 1.1949E−08 | −2.2113E−10 |
| S11 | 2.0839E−04 | −2.3835E−05 | 1.8716E−06 | −9.5449E−08 | 2.8162E−09 | −3.4658E−11 | −8.3640E−14 |
| S12 | −2.2840E−05 | 2.2686E−06 | −1.7172E−07 | 9.6341E−09 | −3.7742E−10 | 9.1698E−12 | −1.0327E−13 |
| S13 | 6.7259E−07 | −2.7943E−08 | 7.5473E−10 | −1.1954E−11 | 8.4220E−14 | 0.0000E+00 | 0.0000E+00 |
| S14 | 5.2022E−06 | −3.6373E−07 | 1.8456E−08 | −6.6018E−10 | 1.5768E−11 | −2.2549E−13 | 1.4592E−15 |

Figure 10A:
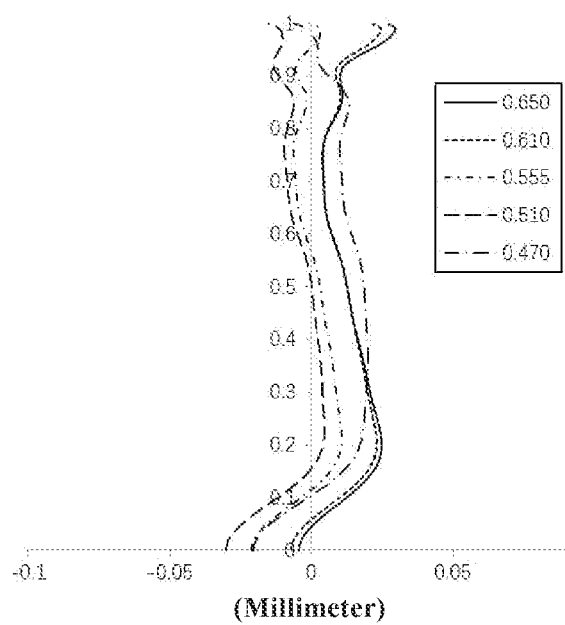
FIG. 10A and FIG. 10B respectively illustrate a longitudinal aberration curve and an astigmatic curve of the optical imaging lens assembly in Embodiment 5.
Figure 10B:
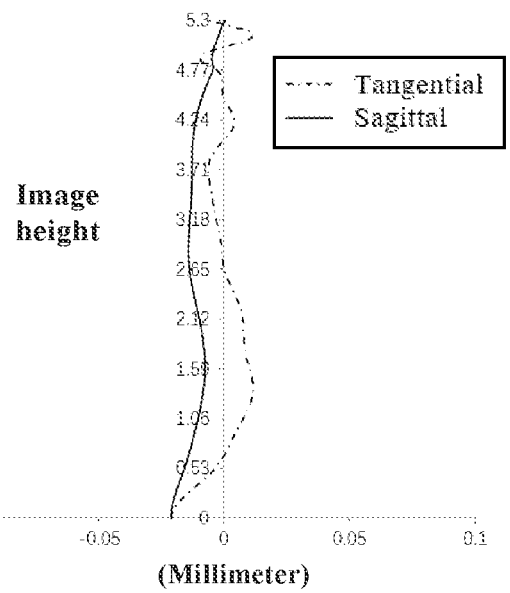

FIG. 10A illustrates a longitudinal aberration curve of the optical imaging lens assembly according to Embodiment 5, representing deviations of focal points of light of different wavelengths converged after passing through the lens assembly. FIG. 10B illustrates an astigmatic curve of the optical imaging lens assembly according to Embodiment 5, representing a curvature of a tangential image plane and a curvature of a sagittal image plane. It can be seen from FIGS. 10A-10B that the optical imaging lens assembly given in Embodiment 5 can achieve a good imaging quality.

Embodiment 6

Figure 11:
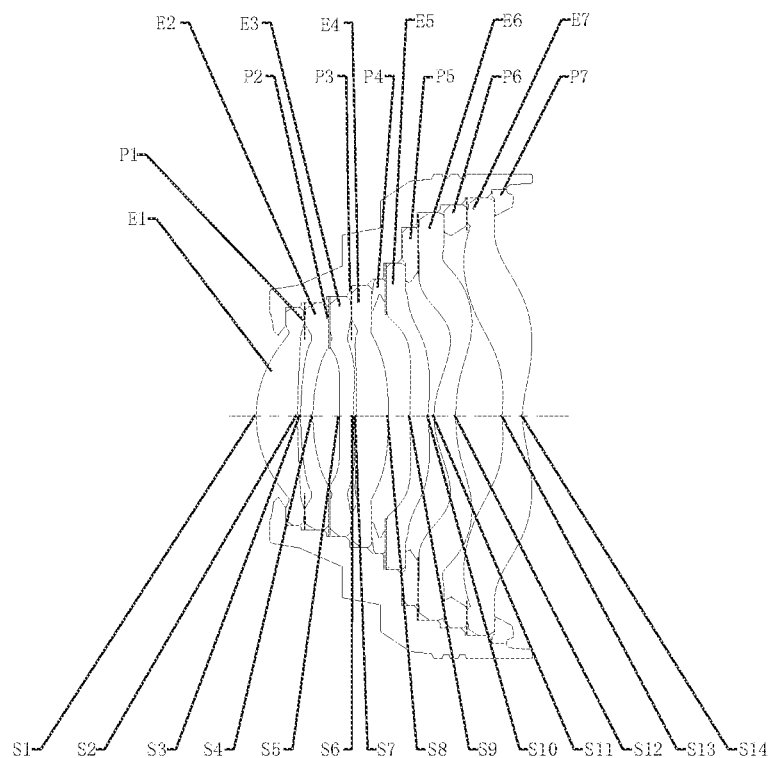
FIG. 11 illustrates a schematic structural diagram of an optical imaging lens assembly according to Embodiment 6 of the present disclosure.

An optical imaging lens assembly according to Embodiment 6 of the present disclosure is described below with reference to FIG. 11. FIG. 11 is a schematic structural diagram of the optical imaging lens assembly according to Embodiment 6 of the present disclosure.

As shown in FIG. 11, the optical imaging lens assembly includes a lens barrel and a lens group. The lens group from an object side to an image side sequentially includes: a diaphragm STO (not shown), a first lens E1, a second lens E2, a third lens E3, a fourth lens E4, a fifth lens E5, a sixth lens E6, a seventh lens E7, an optical filter (not shown), and an image plane S17 (not shown).

As shown in FIG. 11, the optical imaging lens assembly may further include a first spacing element P1, a second spacing element P2, a third spacing element P3, a fourth spacing element P4, a fifth spacing element P5, a sixth spacing element P6, and a seventh spacing element P7 arranged sequentially from the object side to the image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter has an object-side surface S15 and an image-side surface S16. Light from an object sequentially passes through the surfaces S1-S16 and finally forms an image on the image plane 17.

In this example, a total effective focal length f of the optical imaging lens assembly is 5.46 mm, a total track length of the optical imaging lens assembly TTL is 6.95 mm, half of a diagonal length ImgH of an effective pixel area on the image plane of the optical imaging lens assembly is 5.32 mm, half of a maximal field-of-view Semi-FOV of the optical imaging lens assembly is 43.54°, and a relative F-number Fno of the optical imaging lens assembly is 1.50.

Table 16 shows a table of basic parameters of the optical imaging lens assembly in Embodiment 6. Here, the units of a radius of curvature, a thickness/distance and a focal length are millimeters (mm). Table 17-1 and Table 17-2 show tables of basic parameters of the lens barrel and the spacing elements in the optical imaging lens assembly of Embodiment 6, where the units of the parameters in Table 17-1 and Table 17-2 are millimeters (mm). Table 18-1 and Table 18-2 show the high-order coefficients applicable to the aspheric surfaces in Embodiment 6. Here, the surface type of each aspheric surface may be defined using the formula (1) given in Embodiment 1.

TABLE 16

| surface number | surface type | radius of curvature | thickness/ distance | material refractive index | material abbe number | focal length | comic coefficient |
|---|---|---|---|---|---|---|---|
| OBJ | spherical | infinite | infinite | | | | |
| STO | spherical | infinite | −0.5000 | | | | |

TABLE 16-continued

| surface number | surface type | radius of curvature | thickness/ distance | material refractive index | abbe number | focal length | conic coefficient |
|---|---|---|---|---|---|---|---|
| S1 | aspheric | 2.5949 | 0.9285 | 1.54 | 56.1 | 6.01 | 0.0000 |
| S2 | aspheric | 10.8566 | 0.0713 | | | | 0.0000 |
| S3 | aspheric | 5.9313 | 0.2750 | 1.67 | 19.2 | −17.82 | 0.0000 |
| S4 | aspheric | 3.9027 | 0.5996 | | | | 0.0000 |
| S5 | aspheric | 15.6871 | 0.3100 | 1.67 | 19.2 | −33.84 | 0.0000 |
| S6 | aspheric | 9.2407 | 0.0610 | | | | 0.0000 |
| S7 | aspheric | 56.2646 | 0.7269 | 1.54 | 56.1 | 14.68 | 0.0000 |
| S8 | aspheric | −9.2938 | 0.4863 | | | | 0.0000 |
| S9 | aspheric | 14.8292 | 0.4095 | 1.57 | 37.3 | −8.38 | 0.0000 |
| S10 | aspheric | 3.5799 | 0.1275 | | | | 0.0000 |
| S11 | aspheric | 1.6643 | 0.4902 | 1.54 | 56.1 | 4.20 | −1.0000 |
| S12 | aspheric | 5.4394 | 1.0490 | | | | 0.0000 |
| S13 | aspheric | 9.0296 | 0.4500 | 1.54 | 55.6 | −4.81 | 0.0000 |
| S14 | aspheric | 1.9747 | 0.2634 | | | | −1.0000 |
| S15 | spherical | infinite | 0.2100 | 1.52 | 64.2 | | |
| S16 | spherical | infinite | 0.4910 | | | | |
| S17 | spherical | infinite | | | | | |

TABLE 17-1

| D1s | D2m | d3s | D4m | D4s | d5s | d5m | d6s | SD52 |
|---|---|---|---|---|---|---|---|---|
| 5.10 | 5.40 | 3.45 | 5.42 | 6.18 | 6.11 | 6.49 | 8.30 | 2.75 |

TABLE 17-2

| D7s | D7m | ds | D0m | EP01 | EP12 | EP23 | EP45 |
|---|---|---|---|---|---|---|---|
| 10.16 | 9.96 | 3.65 | 10.52 | 0.77 | 0.54 | 0.48 | 0.38 |

TABLE 18-1

| surface number | A4 | A6 | A8 | A10 | A12 | A14 | A16 |
|---|---|---|---|---|---|---|---|
| S1 | −5.2436E−03 | 3.2330E−02 | −1.2077E−01 | 3.0007E−01 | −5.1551E−01 | 6.2846E−01 | −5.5297E−01 |
| S2 | −3.8937E−02 | 4.4313E−02 | −3.3599E−02 | 1.0616E−02 | 2.3091E−02 | −6.1541E−02 | 8,4242E−02 |
| S3 | −5.3517E−02 | 6.5897E−02 | −9.7803E−02 | 2.2881E−01 | −4.7966E−01 | 7.2212E−01 | −7.6641E−01 |
| S4 | −1.8091E−02 | −1.6053E−02 | 2.3074E−01 | −9.1857E−01 | 2.3379E+00 | −4.1282E+00 | 5.1989E+00 |
| S5 | −3.6967E−02 | 1.3544E−02 | −1.3360E−01 | 5.8253E−01 | −1.5889E+00 | 2.9037E+00 | −3.7108E+00 |
| S6 | −1.4434E−02 | −6.9903E−02 | 1.4758E−01 | −2.0670E−01 | 2.0132E−01 | −1.8288E−01 | 1.9942E−01 |
| S7 | 7.3435E−03 | −3.6083E−02 | −2.0930E−02 | 2.5025E−01 | −6.0304E−01 | 8.2247E−01 | −7.3225E−01 |
| S8 | −1.1144E−02 | −2.4895E−02 | 7.7747E−02 | −1.7358E−01 | 2.5958E−01 | −2.6953E−01 | 2.0025E−01 |
| S9 | −4.2649E−02 | 4.4917E−02 | −3.1588E−02 | 5.3854E−03 | 8.9667E−03 | −7.9103E−03 | 1.9661E−03 |
| S10 | −2.4496E−01 | 2.2012E−01 | −1.5833E−01 | 8.6605E−02 | −3.3980E−02 | 8.2108E−03 | −5.6060E−04 |
| S11 | −1.4038E−01 | 1.0277E−01 | −7.6305E−02 | 4.3169E−02 | −1.8348E−02 | 5.7131E−03 | −1.2879E−03 |
| S12 | 8.0480E−02 | −7.2676E−02 | 3.8369E−02 | −1.5443E−02 | 4.6486E−03 | −1.0431E−03 | 1.7660E−04 |
| S13 | −1.3811E−01 | 6.0293E−02 | −2.0586E−02 | 5.3732E−03 | −9.8638E−04 | 1.2516E−04 | −1.1022E−05 |
| S14 | −1.5650E−01 | 7.8127E−02 | −3.2699E−02 | 1.0401E−02 | −2.4529E−03 | 4.2646E−04 | −5.4769E−05 |

TABLE 18-2

| surface number | A18 | A20 | A22 | A24 | A26 | A28 | A30 |
|---|---|---|---|---|---|---|---|
| S1 | 3.5401E−01 | −1.6473E−01 | 5.5059E−02 | −1.2864E−02 | 1.9927E−03 | −1.8376E−04 | 7.6312E−06 |
| S2 | −7.5565E−02 | 4.6293E−02 | −1.9461E−02 | 5.5191E−03 | −1.0085E−03 | 1.0714E−04 | −5.0254E−06 |
| S3 | 5.7913E−01 | −3.1292E−01 | 1.2002E−01 | −3.1914E−02 | 5.5967E−03 | −5.8260E−04 | 2.7295E−05 |
| S4 | −4.7230E+00 | 3.0966E+00 | −1.4492E+00 | 4.7147E−01 | −1.0119E−01 | 1.2872E−02 | −7.3459E−04 |
| S5 | 3.3848E+00 | −2.2161E+00 | 1.0332E+00 | −3.3466E−01 | 7.1560E−02 | −9.0794E−03 | 5.1749E−04 |
| S6 | −2.0447E−01 | 1.5357E−01 | −7.8555E−02 | 2.6672E−02 | −5.7647E−03 | 7.1923E−04 | −3.9484E−05 |
| S7 | 4.4938E−01 | −1.9431E−01 | 5.9230E−02 | −1.2474E−02 | 1.7285E−03 | −1.4181E−04 | 5.2174E−06 |
| S8 | −1.0811E−01 | 4.2557E−02 | −1.2108E−02 | 2.4278E−03 | −3.2579E−04 | 2.6282E−05 | −9.6428E−07 |
| S9 | 9.1436E−04 | −9.0919E−04 | 3.4675E−04 | −7.5988E−05 | 9.9852E−06 | −7.3329E−07 | 2.3187E−08 |
| S10 | −3.6896E−04 | 1.5378E−04 | −3.0859E−05 | 3.7555E−06 | −2.8116E−07 | 1.1949E−08 | −2.2113E−10 |
| S11 | 2.0839E−04 | −2.3835E−05 | 1.8716E−06 | −9.5449E−08 | 2.8162E−09 | −3.4658E−11 | −8.3640E−14 |
| S12 | −2.2840E−05 | 2.2686E−06 | −1.7172E−07 | 9.6341E−09 | −3.7742E−10 | 9.1698E−12 | −1.0327E−13 |
| S13 | 6.7259E−07 | −2.7943E−08 | 7.5473E−10 | −1.1954E−11 | 8.4220E−14 | 0.0000E+00 | 0.0000E+00 |
| S14 | 5.2022E−06 | −3.6373E−07 | 1.8456E−08 | −6.6018E−10 | 1.5768E−11 | −2.2549E−13 | 1.4592E−15 |

Figure 12A:
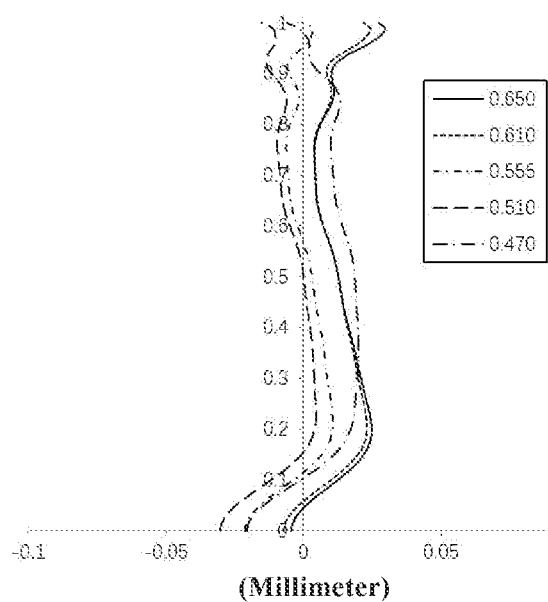
FIG. 12A and FIG. 12B respectively illustrate a longitudinal aberration curve and an astigmatic curve of the optical imaging lens assembly in Embodiment 6.
Figure 12B:
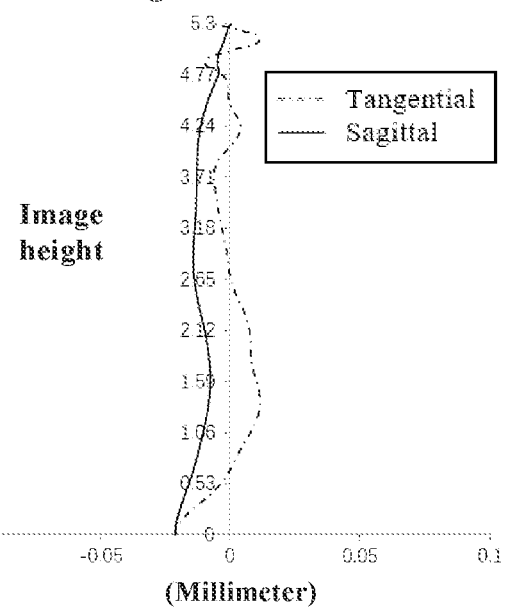
Figure 13:
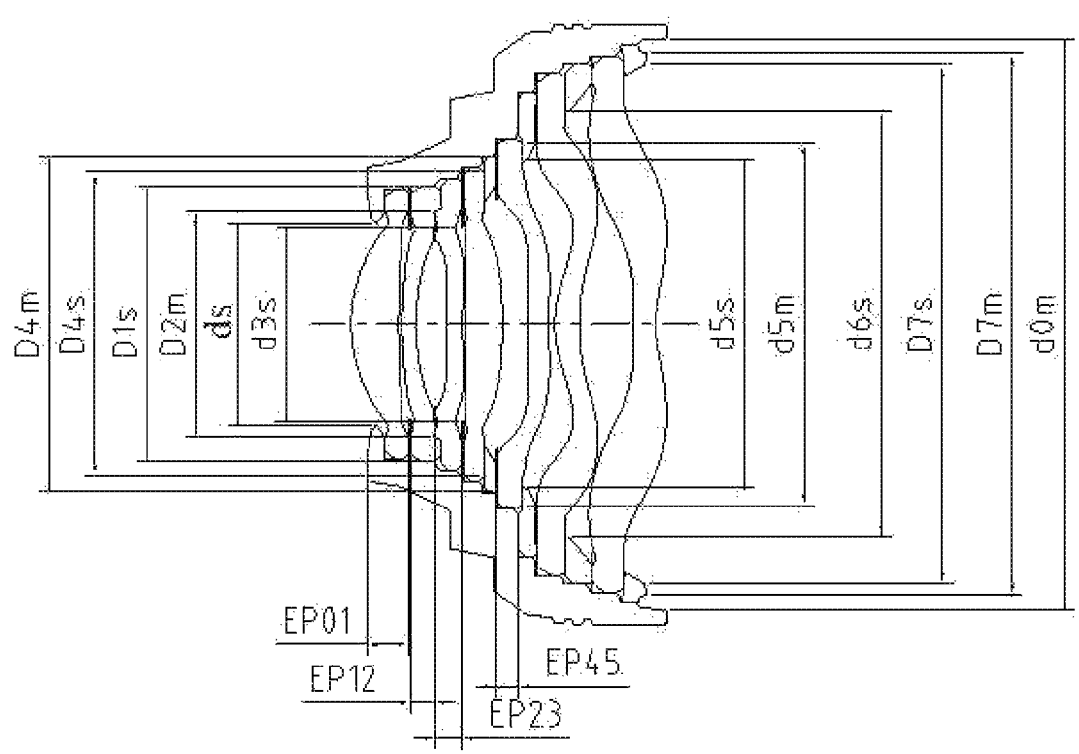
FIG. 13 illustrates a schematic diagram of some parameters of an optical imaging lens assembly according to an embodiment of the present disclosure.

FIG. 12A illustrates a longitudinal aberration curve of the optical imaging lens assembly according to Embodiment 6, representing deviations of focal points of light of different wavelengths converged after passing through the lens assembly. FIG. 12B illustrates an astigmatic curve of the optical imaging lens assembly according to Embodiment 6, representing a curvature of a tangential image plane and a curvature of a sagittal image plane. It can be seen from FIGS. 12A-12B that the optical imaging lens assembly given in Embodiment 6 can achieve a good imaging quality.

In summary, Embodiments 1-6 respectively satisfy the relationships shown in Table 19.

TABLE 19

| conditional expression/embodiment | 1 | 2 | 3 | 4 | 5 | 6 |
|---|---|---|---|---|---|---|
| D1s/(EP01 − EP12) + D2m/CT2 | 24.34 | 29.25 | 26.92 | 34.15 | 29.45 | 41.43 |
| \|d0m/R1\| + EP23/(CT3 − CT2) | 14.21 | 14.06 | 15.95 | 16.44 | 19.04 | 17.65 |
| R6/CT3 + D4s/CT4 | 27.47 | 27.11 | 32.73 | 32.77 | 37.98 | 37.27 |
| (\|D7m/R14\| − \|d6s/R10\|) × Fno | 6.75 | 6.71 | 3.86 | 3.79 | 4.25 | 4.09 |
| D4m/EP45 + ds/T45 | 23.99 | 28.18 | 19.55 | 20.28 | 22.33 | 23.77 |
| d5s/CT4 | 8.16 | 8.32 | 9.79 | 10.14 | 8.16 | 8.41 |
| R2/(CT6 − T56) + [D7s/R10\| | 60.07 | 60.07 | 45.14 | 45.18 | 32.74 | 32.77 |
| d5s/T56 + d3s/CT3 | 39.24 | 39.76 | 42.93 | 43.99 | 57.90 | 59.02 |
| d5m × R10/(SD52 × R11) | 6.82 | 6.58 | 4.62 | 4.56 | 5.15 | 5.08 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising a lens barrel and a lens group assembled in the lens barrel, the lens group along an optical axis from an object side to an image side sequentially comprising a first lens, a second lens, a third lens, a fourth lens, a fifth lens, a sixth lens, and a seventh lens having refractive powers, wherein,
   an outer diameter of the seventh lens is greater than an outer diameter of any one of the first lens to the sixth lens;
   three lenses of the first lens to the sixth lens have positive refractive powers, and other three lenses of the first lens to the sixth lens have negative refractive powers; and the optical imaging lens assembly further comprises:
   a first spacing element located between the first lens and the second lens; and
   a second spacing element located between the second lens and the third lens;
   the optical imaging lens assembly satisfies: 24<D1s/(EP01−EP12)+D2m/CT2<42, wherein D1s is an outer diameter of an object-side surface of the first spacing element, EP01 is a spacing distance between an object side end of the lens barrel and the object-side surface of the first spacing element in a direction parallel to the optical axis, EP12 is a spacing distance between an image-side surface of the first spacing element and an object-side surface of the second spacing element in the direction parallel to the optical axis, D2m is an outer diameter of an image-side surface of the second spacing element, and CT2 is a center thickness of the second lens on the optical axis.

2. The optical imaging lens assembly according to claim 1, wherein the optical imaging lens assembly further comprises: a third spacing element located between the third lens and the fourth lens,
   the optical imaging lens assembly satisfies: 14<|d0m/R1|+EP23/(CT3−CT2)<20, wherein, d0m is an inner diameter of an image side end of the lens barrel, R1 is a radius of curvature of an object-side surface of the first lens, EP23 is a spacing distance between the image-side surface of the second spacing element and an object-side surface of the third spacing element in the direction parallel to the optical axis, and CT3 is a center thickness of the third lens on the optical axis.

3. The optical imaging lens assembly according to claim 2, wherein the optical imaging lens assembly further comprises: a fifth spacing element located between the fifth lens and the sixth lens,
   the optical imaging lens assembly satisfies: 39<d5s/T56+d3s/CT3<60, wherein, T56 is a spacing distance between an image-side surface of the fifth lens and an object-side surface of the sixth lens on the optical axis, d3s is an inner diameter of the object-side surface of the third spacing element, d5s is an inner diameter of an object-side surface of the fifth spacing element, and CT3 is the center thickness of the third lens on the optical axis.

4. The optical imaging lens assembly according to claim 3, wherein the optical imaging lens assembly satisfies: 4.0<d5m×R10/(SD52×R11)<7.0, wherein, d5m is an inner diameter of an image-side surface of the fifth spacing element, R10 is a radius of curvature of the image-side surface of the fifth lens, R11 is a radius of curvature of the object-side surface of the sixth lens, and SD52 is a maximal effective radius of the image-side surface of the fifth lens.

5. The optical imaging lens assembly according to claim 1, wherein the optical imaging lens assembly further comprises: a fourth spacing element located between the fourth lens and the fifth lens, the optical imaging lens assembly satisfies: $27.0<R6/CT3+D4s/CT4<38.5$, wherein, R6 is a radius of curvature of an image-side surface of the third lens, CT3 is a center thickness of the third lens on the optical axis, CT4 is a center thickness of the fourth lens on the optical axis, and D4s is an outer diameter of an object-side surface of the fourth spacing element.

6. The optical imaging lens assembly according to claim 5, wherein the optical imaging lens assembly further comprises: a fifth spacing element located between the fifth lens and the sixth lens, the optical imaging lens assembly satisfies: $18.0<D4m/EP45+ds/T45<29$, wherein, D4m is an outer diameter of an image-side surface of the fourth spacing element, EP45 is a spacing distance between the image-side surface of the fourth spacing element and an object-side surface of the fifth spacing element in the direction parallel to the optical axis, ds is an open bore inner diameter of the object side end of the lens barrel, and T45 is a spacing distance between an image-side surface of the fourth lens and an object-side surface of the fifth lens on the optical axis.

7. The optical imaging lens assembly according to claim 6, wherein the optical imaging lens assembly satisfies: $8.0<d5s/CT4<11.0$, wherein, d5s is an inner diameter of the object-side surface of the fifth spacing element, and CT4 is the center thickness of the fourth lens on the optical axis.

8. The optical imaging lens assembly according to claim 1, wherein the optical imaging lens assembly further comprises:

a sixth spacing element located between the sixth lens and the seventh lens; and a seventh spacing element located on an image-side surface of the seventh lens;

the optical imaging lens assembly satisfies: $2.0<(|D7m/R14|-|d6s/R10|)\times Fno<5.0$, wherein, R10 is a radius of curvature of an image-side surface of the fifth lens, R14 is a radius of curvature of the image-side surface of the seventh lens, Fno is a relative F number of the optical imaging lens assembly, d6s is an inner diameter of an object-side surface of the sixth spacing element, and D7m is an outer diameter of an image-side surface of the seventh spacing element.

9. The optical imaging lens assembly according to claim 8, wherein the optical imaging lens assembly satisfies: $30.0<R2/(CT6-T56)+|D7s/R10|<61.0$, wherein, D7s is an outer diameter of an object-side surface of the seventh spacing element, CT6 is a center thickness of the sixth lens on the optical axis, T56 is a spacing distance between the image-side surface of the fifth lens and an object-side surface of the sixth lens on the optical axis, R2 is a radius of curvature of an image-side surface of the first lens, and R10 is the radius of curvature of the image-side surface of the fifth lens.

10. The optical imaging lens assembly according to claim 1, wherein an object-side surface of the fourth lens is a convex surface, and the image-side surface of the fourth lens is a convex surface.

11. The optical imaging lens assembly according to claim 1, wherein a refractive power φ5 of the fifth lens and a refractive power φ7 of the seventh lens satisfy:

$\varphi5\times\varphi7>0$.

12. An optical imaging lens assembly, comprising a lens barrel and a lens group assembled in the lens barrel, the lens group along an optical axis from an object side to an image side sequentially comprising a first lens, a second lens, a third lens, a fourth lens, a fifth lens, a sixth lens, and a seventh lens having refractive powers, wherein, a refractive power φ5 of the fifth lens and a refractive power φ7 of the seventh lens satisfy:

$\varphi5\times\varphi7>0$;

the optical imaging lens assembly further comprises:

a third spacing element located between the third lens and the fourth lens; and a fifth spacing element located between the fifth lens and the sixth lens;

the optical imaging lens assembly satisfies: $39<d5s/T56+d3s/CT3<60$, wherein, T56 is a spacing distance between an image-side surface of the fifth lens and an object-side surface of the sixth lens on the optical axis, d3s is an inner diameter of an object-side surface of the third spacing element, d5s is an inner diameter of an object-side surface of the fifth spacing element, and CT3 is a center thickness of the third lens on the optical axis.

13. The optical imaging lens assembly according to claim 12, wherein the optical imaging lens assembly further comprises:

a first spacing element located between the first lens and the second lens; and a second spacing element located between the second lens and the third lens;

the optical imaging lens assembly satisfies: $24<D1s/(EP01-EP12)+D2m/CT2<42$, wherein D1s is an outer diameter of an object-side surface of the first spacing element, EP01 is a spacing distance between an object side end of the lens barrel and the object-side surface of the first spacing element in a direction parallel to the optical axis, EP12 is a spacing distance between an image-side surface of the first spacing element and an object-side surface of the second spacing element in the direction parallel to the optical axis, D2m is an outer diameter of an image-side surface of the second spacing element, and CT2 is a center thickness of the second lens on the optical axis.

14. The optical imaging lens assembly according to claim 13, wherein the optical imaging lens assembly satisfies: $14<|d0m/R1|+EP23/(CT3-CT2)<20$, wherein, d0m is an inner diameter of an image side end of the lens barrel, R1 is a radius of curvature of an object-side surface of the first lens, EP23 is a spacing distance between the image-side surface of the second spacing element and the object-side surface of the third spacing element in the direction parallel to the optical axis, and CT3 is the center thickness of the third lens on the optical axis.

15. The optical imaging lens assembly according to claim 12, wherein the optical imaging lens assembly further comprises: a fourth spacing element located between the fourth lens and the fifth lens, the optical imaging lens assembly satisfies: $27.0<R6/CT3+D4s/CT4<38.5$, wherein, R6 is a radius of curvature of an image-side surface of the third lens, CT4 is a center thickness of the fourth lens on the optical axis, and D4s is an outer diameter of an object-side surface of the fourth spacing element.

16. The optical imaging lens assembly according to claim 15, wherein the optical imaging lens assembly satisfies: $18.0<D4m/EP45+ds/T45<29$, wherein, D4m is an outer diameter of an image-side surface of the fourth spacing element, EP45 is a spacing distance between the image-side surface of the fourth spacing element and the object-side surface of the fifth spacing element in the direction parallel to the optical axis, ds is an open bore inner diameter of an object side end of the lens barrel, and T45 is a spacing distance between an image-side surface of the fourth lens and an object-side surface of the fifth lens on the optical axis.

17. The optical imaging lens assembly according to claim 12, wherein the optical imaging lens assembly further comprises:
a sixth spacing element located between the sixth lens and the seventh lens; and
a seventh spacing element located on an image-side surface of the seventh lens;
the optical imaging lens assembly satisfies: $2.0<(|D7m/R14|-|d6s/R10|)\times Fno<5.0$, wherein, R10 is a radius of curvature of the image-side surface of the fifth lens, R14 is a radius of curvature of the image-side surface of the seventh lens, Fno is a relative F number of the optical imaging lens assembly, d6s is an inner diameter of an object-side surface of the sixth spacing element, and D7m is an outer diameter of an image-side surface of the seventh spacing element.

18. The optical imaging lens assembly according to claim 17, wherein the optical imaging lens assembly satisfies: $30.0<R2/(CT6-T56)+|D7s/R10|<61.0$, wherein, D7s is an outer diameter of an object-side surface of the seventh spacing element, CT6 is a center thickness of the sixth lens on the optical axis, R2 is a radius of curvature of an image-side surface of the first lens.

19. The optical imaging lens assembly according to claim 12, wherein the optical imaging lens assembly satisfies: $8.0<d5s/CT4<11.0$, wherein, CT4 is a center thickness of the fourth lens on the optical axis.

20. The optical imaging lens assembly according to claim 12, wherein the optical imaging lens assembly satisfies: $4.0<d5m\times R10/(SD52\times R11)<7.0$, wherein, d5m is an inner diameter of an image-side surface of the fifth spacing element, R10 is a radius of curvature of the image-side surface of the fifth lens, R11 is a radius of curvature of the object-side surface of the sixth lens, and SD52 is a maximal effective radius of the image-side surface of the fifth lens.

* * * * *